United States Patent [19]

Asada

[11] Patent Number: 5,030,186
[45] Date of Patent: Jul. 9, 1991

[54] AUTOMATIC TRANSMISSION
[75] Inventor: Toshiyuki Asada, Susono, Japan
[73] Assignee: Toyota Jidosha Kabushiki Kaisha, Toyota, Japan
[21] Appl. No.: 474,462
[22] Filed: Feb. 2, 1990
[30] Foreign Application Priority Data
  Feb. 3, 1989 [JP] Japan .................................. 1-25319
  Jul. 18, 1989 [JP] Japan ................................. 1-185152
[51] Int. Cl.⁵ ........................................... F16H 3/70
[52] U.S. Cl. ................................... 475/278; 475/285;
                                                475/289; 475/330
[58] Field of Search ............... 475/275, 277, 278, 284,
                                    475/285, 288, 289, 329, 330
[56] References Cited
U.S. PATENT DOCUMENTS

| 3,811,343 | 5/1974 | Mori et al. | 74/759 |
| 3,863,524 | 2/1975 | Mori et al. | 74/765 |
| 4,089,239 | 5/1978 | Murakami et al. | 475/277 |
| 4,660,439 | 4/1987 | Hiraiwa | 475/278 X |
| 4,963,124 | 10/1990 | Takahashi et al. | 475/278 |

FOREIGN PATENT DOCUMENTS 2406124 10/1974 Fed. Rep. of Germany .
2612020 11/1976 Fed. Rep. of Germany .
51-17767 2/1976 Japan .
51-48062 4/1976 Japan .
51-108168 9/1976 Japan .
51-108170 9/1976 Japan .
51-127968 11/1976 Japan .
59-26645 2/1984 Japan .

Primary Examiner—Dwight Diehl
Attorney, Agent, or Firm—Cushman, Darby & Cushman

[57] ABSTRACT

A gear train for changing the rotational speed of an input shaft to transmit the resultant rotation to an output shaft consists of single pinion type first and third planetary gear sets and a double pinion type second planetary gear set. A sun gear of the first planetary gear system is normally or selectively connected to a carrier of the third planetary gear set, the carrier of the third planetary gear set is normally or selectively connected to a sun gear of the second planetary gear set, a carrier of the first planetary gear set is normally or selectively connected to a ring gear of the third planetary gear set, a ring gear of the first planetary gear set is normally or selectively connected to a ring gear of the second planetary gear set, the sun gear of the second planetary gear set is normally or selectively connected to a sun gear of the third planetary gear set, whereby at least five forward speeds and one reverse are permitted to be set.

44 Claims, 12 Drawing Sheets

AUTOMATIC TRANSMISSION

BACKGROUND OF THE INVENTION

1. Field of the Invention:

This invention relates to an automatic transmission for use in a vehicle and, more particularly, to an automatic transmission having a gear train having two single pinion type planetary gear sets and one double pinion type planetary gear set.

2. Description of the Prior Art:

As is well known, a planetary gear set has three components, i.e., a sun gear, a ring gear and a carrier for holding a pinion gear meshing with the sun gear and the ring gear, wherein one component is defined as the input member, another component is defined as the output member and the other remaining component is held stationary, so that the input rotational speed is either increased or reduced forward or reversely to generate the output. Thus, in general, a plurality of planetary gear sets are combined to constitute a gear train for automatic transmission up to now. In this case, the obtained change gear ratio is changed variously according to how to combine the planetary gear sets, a value of the gear ratio (ratio of the number of teeth of sun gear to that of ring gear) of the planetary gear set and further which of the single pinion type planetary gear set and double pinion type planetary gear set is used, while all of the combinations cannot be necessarily put into practical use. Therefore, the gear trains that are possible in practical use are limited according to various requirements of the mounting property on a vehicle, the possibility of manufacture, the gear change characteristics, the required power performance or the like. In other words, since a great number of gear trains are constituted according to various combinations of planetary gear sets and ways of setting the gear ratios, it is very difficult to create the gear train satisfying the various requirements of the automatic transmission for use in a vehicle.

Conventionally, a number of automatic transmissions devised under such background have been proposed, and three of these automatic transmissions, each of which uses three planetary gear sets, are disclosed in Japanese Patent Laid-open Nos. 60—88252, 51—48062 and 54—132058, for example.

The automatic transmission disclosed in the above-mentioned Japanese Patent Laid-open No. 60—88252 is so constituted that three single pinion type planetary gear sets are combined to constitute a gear train, whereby five forward speeds and one reverse are permitted to set. However, in this automatic transmission, if the gear ratios of the respective planetary gear sets are so set that the change gear ratios of the respective gear change stages are approximately relevant to geometric series to prevent a drive force of a vehicle from remarkable reduction before and after the gear change, the gear ratio of any planetary gear set needs to be set to a remarkably large value, resulting disadvantageously in the enlargement of an outer diameter of the pertinent planetary gear set. On the contrary, if the gear ratios of the respective planetary gear sets are set to such an extent that the respective planetary gear sets do not particularly increase in outer diameter, the change gear ratios of the respective gear change stages are not generally relevant to geometric series to thereby bring about the degradation of the power performance of the vehicle.

Also, the automatic transmission described in the above-mentioned Japanese Patent Laid-open No. 51-48062 is so constituted that two single pinion type planetary gear sets and one double pinion type planetary gear set are combined to constitute a gear train, whereby five forward speeds and two reverses are permitted to set. In this automatic transmission, however, when the gear change is made between the first gear and the second gear and between the second gear and the third gear, it is necessary to change the engaged and released conditions of four engaging means consisting of two clutch means and two brake means, so that shocks are worsened or complicated gear change control is inevitably done.

Further, the automatic transmission described in the above-mentioned Japanese Patent Laid-open No. 54—132058 is so constituted that one Ravignawx type planetary gear set and one single pinion type planetary gear set or two single pinion type planetary gear sets and one double pinion type planetary gear set are combined to constitute a gear train, whereby five forward speeds and one reverse are permitted to set. In this automatic transmission, however, a large load torque is exerted to sun gears of the respective planetary gear sets in the first and second gears and also in the reverse to be unfavorable to the strength and the durability. Also, since the power circulation takes place in the third forward gear, this automatic transmission is not only disadvantageous to the strength and the durability in that respect, but also it degrades the transmitting efficiency of power.

SUMMARY OF THE INVENTION

An object of the present invention is to provide an automatic transmission provided with a gear train consisting of two single pinion type planetary gear sets and one double pinion type planetary gear set and capable of setting at least five forward speeds and one reverse.

Another object of the present invention is to provide an automatic transmission capable of facilitating the control of gear change.

A further object of the present invention is to provide a compact automatic transmission.

To achieve the above objects, an automatic transmission according to the present invention comprises a gear train consisting of a single pinion type first planetary gear set, a double pinion type second planetary gear set and a single pinion type third planetary gear set, wherein in the gear train, a ring gear of the first planetary gear set is normally or selectively connected to a ring gear of the second planetary gear set, a carrier of the first planetary gear set is normally or selectively connected to a ring gear of the third planetary gear set, a sun gear of the second planetary gear set is normally or selectively connected to a carrier of the third planetary gear set, and further the sun gear of the second planetary gear set is normally or selectively connected to a sun gear of the third planetary gear set. The rotation of an input shaft is increased or reduced through the gear train to be transmitted to an output shaft.

Also, the automatic transmission according to the present invention comprises clutch means for selectively connecting the input shaft to a carrier of the second planetary gear set, another clutch means for selectively connecting the input shaft to the sun gear of the second planetary gear set, further clutch means for selectively connecting the sun gear of the second planetary gear set to the carrier of the third planetary gear set, still further clutch means for selectively connecting the sun gear of the second planetary gear set to the sun gear of the third planetary gear set, brake means for selectively stopping the rotation of the first planetary gear set, and another brake means for selectively stopping the rotation of the sun gear of the third planetary gear set.

These clutch means and brake means are properly engaged or released to set at least five forward speeds and one reverse. A plurality of kinds of combination patterns of the clutch means and brake means to be engaged are provided to set any gear change stage. Further, the automatic transmission according to the present invention is permitted to accomplish the gear change from any one gear to another gear by changing over either two of the clutch means and brake means. Thus, the clutch means or brake means associated with the gear change has such the constitution including a one-way clutch to thereby perform the gear change which has few shocks and is easy to control.

The above and further objects and features of the present invention will be more apparent from the following detailed description when the same is read in connection with the accompanying drawings. It must be understood, however, that the drawings are for the purpose of illustration only and are not intended as a definition of limits of this invention.

DETAILED DESCRIPTION OF THE PREFERRED EMBODIMENTS

Figure 1:
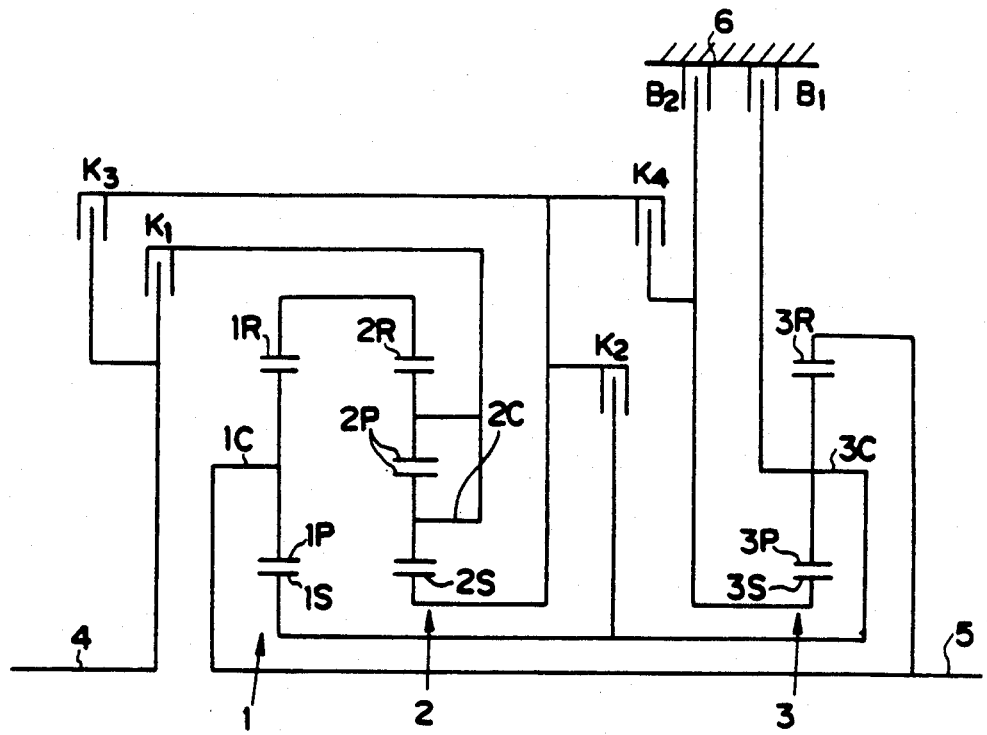
FIGS. 1 through 24 are skelton diagrams respectively showing embodiments according to the present invention in principle.

Referring to FIG. 1, among three planetary gear sets constituting a gear train, each of a first planetary gear set 1 and a third planetary gear set 3 is a single pinion type planetary gear set, and a second planetary gear set 2 is a double pinion type planetary gear set. That is, the first planetary gear set 1 consists of a sun gear 1S, a ring gear 1R disposed to be concentrical with the sun gear 1S and a carrier 1C for holding a pinion gear 1P meshing with these gears 1S, 1R as main components, whereas the second planetary gear set 2 consists of a sun gear 2S, a ring gear 2R and a carrier 2C for holding at least a pair of pinion gears 2P disposed between these gears 2S, 2R to mesh with each other as main components. Also, the third planetary gear set 3, similarly to the first planetary gear set 1, consists of a sun gear 3S, a ring gear 3R disposed to be concentrical with the sun gear 3S and a carrier 3C for holding a pinion gear 3P meshing with these gears 3S, 3R as main components. The ring gear 1R of the first planetary gear set 1 and the ring gear 2R of the second planetary gear set 2 are connected to each other so as to rotate as a single unit, while the carrier 1C of the first planetary gear set 1 and the ring gear 3R of the third planetary gear set 3 are connected to each other so as to rotate as a single unit. Further, the sun gear 1S of the first planetary gear set 1 and the carrier 3C of the third planetary gear set 3 are connected to each other so as to rotate as a single unit. On the other hand, fourth clutch means K4 is provided between the sun gear 2S of the second planetary gear set 2 and the sun gear 3S of the third planetary gear set 3 to interconnect selectively these sun gears 2S, 3S. Also, second clutch means K2 is disposed between the sun gear 2S of the second planetary gear set 2 and the carrier 3C of the third planetary gear set 3 to interconnect selectively the sun gear 2S and the carrier 3C.

Further, for the connecting structure of the respective members as noted above, use is made of a quill shaft, a solid shaft, a proper connecting drum or like connecting structure employed in a general automatic transmission.

An input shaft 4 is connected to an engine (not shown) through power transmitting means (not shown) such as a torque converter and a fluid coupling. First clutch means K1 is provided between the input shaft 4 and the carrier 2C of the second planetary gear set 2 to interconnect selectively the input shaft 4 and the carrier 2C, and third clutch means K3 is provided between the input shaft 4 and the sun gear 2S of the second planetary gear set 2 to interconnect selectively the input shaft 4 and the sun gear 2S.

The respective clutch means K1, K2, K3 and K4 generally function to selectively interconnect the respective members or release the interconnection thereof, and are permitted to employ a wet type multi-disc clutch engaged or released by a hydraulic servo system or like system employed generally in the automatic transmission, a one-way clutch or a structure in which the wet type multi-disc clutch and one-way clutch are disposed in series or parallel relationship, if necessary. Further, since the respective constituent members in the practical use are restricted from the view point of the arrangement, it is a matter of course that a proper intermediate member such as a connecting drum is interposed as a connecting member for each of the clutch means K1, K2, K3 and K4.

First brake means B1 for selectively blocking the rotation of the sun gear 1S of the first planetary gear set 1 and the carrier 3C of the third planetary gear set 3, which are connected to each other, is provided between the carrier 3C and a transmission casing (hereinafter will be simply referred to as casing) 6. Also, second brake means B2 for selectively blocking the rotation of the sun gear 3S of the third planetary gear set 3 is provided between the sun gear 3S and the casing 6. For each of these brake means B1, B2, use is made of a band brake or a wet type multi-disc brake driven by a hydraulic servo system or the like generally employed in the automatic transmission, or a one-way clutch, or a combination of these brakes and clutch. Also, in the practical use, it is a matter of course that proper connecting members are respectively interposed between these brake means B1, B2 and the respective members to be held stationary by these brake means B1, B2 or between these brake means B1, B2 and the casing 6.

An output shaft 5 for transmitting the rotation to a propeller shaft or a counter gear (not shown respectively) is connected to the carrier 1C of the first planetary gear set 1 and the ring gear 3R of the third planetary gear set 3, which are connected to each other.

The automatic transmission thus constituted as noted above makes the gear change of five forward speeds and one reverse or seven forward speeds and one reverse possible, and the respective gears are achieved by engaging the clutch means K1, K2, K3 and K4 and the brake means B1, B2 as shown on Table 1.

TABLE 1

| | clutch means | | | | brake means | | gear ratio ($\rho_1 = 0.398, \rho_2 = 0.313, \rho_3 = 0.365$) | |
|---|---|---|---|---|---|---|---|---|
| | K1 | K2 | K3 | K4 | B1 | B2 | | |
| 1st | ○ | X | X | ○ | ○ | X | $1 + \rho_1 + \dfrac{\rho_2(1 + \rho_3 + \rho_1\rho_3)}{\rho_3(1 - \rho_2)}$ | 3.283 |
| 2nd | ○ | ○ | X | X | ○ | X | $(1 + \rho_1)/(1 + \rho_2)$ | 2.035 |
| 3rd | ○ | X | ○ | X | ○ | X | $1 + \rho_1$ | 1.398 |
| 4th | ○* | ○* | ○* | ○* | X | X | $1$ | 1.000 |
| 5th | X | ○ | ○ | X | X | ○ | $1/(1 + \rho_3)$ | 0.733 |
| Rev | X | X | ○ | ○ | ○ | X | $-1/\rho_3$ | -2.740 |
| 2.5th | ○ | X | X | ○ | X | ○ | $\dfrac{1 + \rho_3 + \rho_1\rho_3}{(1 - \rho_2)(1 + \rho_3)}$ | 1.611 |
| 3.5th | ○ | X | ○ | X | X | ○ | $(1 + \rho_3 + \rho_1\rho_3)/(1 + \rho_3)$ | 1.106 |

*At least either three clutch means are engaged.

Further, on Table 1, the change gear ratios of the respective gears are shown together with specified values thereof. Each of the specified values is a value obtained when the gear ratios $\rho_1$, $\rho_2$ and $\rho_3$ of the respective planetary gear sets 1, 2 and 3 are defined as 0.398, 0.313 and 0.365, respectively. Further, on Table 1, the mark ○ represents the engaged condition and the mark X represents the released condition. Hereinafter will be first described the case of setting five forward speeds and one reverse and then two speeds which can be added thereto.

First gear

The first and fourth clutch means K1, K4 and the first brake means B1 are engaged. That is, the carrier 2C of the second planetary gear set 2 is connected to the input shaft 4, while the sun gear 2S of the second planetary gear set 2 is connected to the sun gear 3S of the third planetary gear set 3 through the fourth clutch means K4. Further, the sun gear 1S of the first planetary gear set 1 and the carrier 3C of the third planetary gear set 3 connected to the sun gear 1S are held stationary. Accordingly, in the second planetary gear set 2, the carrier 2C rotates together with the input shaft 4, so that the ring gear 2R is rotated forward (in the same direction as the input shaft 4, and the same shall apply hereinafter), and the sun gear 2S is rotated in reverse direction (in the opposite direction to the input shaft 4, and the same shall apply hereinafter). As a result, in the first planetary gear set 1, the ring gear 1R is connected to the ring gear 2R of the second planetary gear set 2, and the sun gear 1S is held stationary, so that the carrier 1C is rotated forward slower than the ring gear 1R. Also, in the third planetary gear set 3, the sun gear 3S is connected to the sun gear 2S of the second planetary gear set 2, and the carrier 3C is held stationary, so that the ring gear 3R is rotated forward. Consequently, the output shaft 5 connected to the carrier 1C of the first planetary gear set 1 and the ring gear 3R of the third planetary gear set 3 is rotated forward together with the carrier 1C and the ring gear 3R at a slower speed than the input shaft 4 to provide the first gear having the largest change gear ratio in the forward speeds. As shown on Table 1, this change gear ratio is represented as follows:

$$(1 + \rho_1) + \frac{\rho_2(1 + \rho_3 + \rho_1\rho_3)}{\rho_3(1 - \rho_2)}$$

and the specified value thereof comes to 3.283. In this case, the power circulation does not take place.

Second gear

The first and second clutch means K1, K2 and the first brake means B1 are engaged. That is, under the first gear condition, the second clutch means K2 is engaged instead of the fourth clutch means K4. In this case, the sun gear 2S of the second planetary gear set 2 is connected to the sun gear 1S of the first planetary gear set 1 and the carrier 3C of the third planetary gear set 3 through the second clutch means K2, while the sun gear 1S of the first planetary gear set 1 and the carrier 3C of the third planetary gear set 3 are held stationary by the first brake means B1, so that the second clutch means K2 substantially acts as a brake and the sun gear 2S of the second planetary gear set 2 is held stationary. Thus, in the second planetary gear set 2, since the carrier 2C is rotated together with the input shaft 4 under the condition that the sun gear 2S is held stationary, the ring gear 2R is rotated forward slower than the input shaft 4. This forward rotation is transmitted to the ring gear 1R of the first planetary gear set 1. In the first planetary gear set 1, since the ring gear 1R slowly rotates forward under the condition that the sun gear 1S is held stationary, the carrier 1C is rotated forward slower than the ring gear 1R. As a result, the output shaft 5 connected to the carrier 1C of the first planetary gear set 1 is rotated forward slower than the input shaft 4 to provide the second gear. Further, in this case, since the sun gear 3S is disconnected from the sun gear 2S of the second planetary gear set 2 and the casing 6, the third planetary gear set 3 does not particularly perform the speed increase and reduction operations. Thus, as shown on Table 1, the change gear ratio in this case is represented as follows;

$$(1+\rho_1)/(1-\rho_2)$$

and the specified value thereof comes to 2.035. The power circulation does not take place also in this case.

Third gear

The first and third clutch means K1, K3 and the first brake means B1 are engaged. That is, under the second gear condition, the third clutch means K3 is engaged instead of the second clutch means K2. Thus, the sun gear 1S of the first planetary gear set 1 and the carrier 3C of the third planetary gear set 3 are in a condition to disconnect from the sun gear 2S of the second planetary gear set 2, and similarly the sun gear 2S of the second planetary gear set 2 is in a condition to disconnect from the sun gear 3S of the third planetary gear set 3. The whole second planetary gear set 2 is rotated forward as a single unit at the same speed as the input shaft 4, since the carrier 2C and the sun gear 2S rotate together with the input shaft 4, and accordingly the ring gear 1R of the first planetary gear set 1 connected to the ring gear 2R of the second planetary gear set 2 is rotated forward at the same speed as the input shaft 4. In the first planetary gear set 1, similarly to the above case, the sun gear 1S is held stationary, so that the ring gear 1R is rotated forward at the same speed as the input shaft 4 is cause the carrier 1C to rotate forward at a slower speed than the input shaft 4. Further, since the sun gear 3S of the third planetary gear set 3 is in a condition to disconnect from the casing 6 and the sun gear 2S of the second planetary gear set 2, the third planetary gear set 3 does not particularly perform the speed increase and reduction operations. Thus, in this case, only the first planetary gear set 1 substantially performs the retarding operation, whereby the rotation of the input shaft 4 is retarded to be transmitted to the output shaft 5. As shown on Table 1, the change gear ratio is represented as follows:

$$(1+\rho_1)$$

and the specified value thereof comes to 1.398. Also, the power circulation does not take place in this case.

Fourth gear

Either at least three out of the first to fourth clutch means K1, K2, K3 and K4 are engaged, and the brake means B1, B2 are released. For example, under the third gear condition, the second clutch means K2 or the fourth clutch means K4 is engaged instead of the first brake means B1. In this case, the first to third clutch means K1 to K3 are engaged or the first, third and fourth clutch means K1, K3 and K4 are engaged. If at least three clutch means are thus engaged, the whole gear train rotates as a single unit together with the input shaft 4 and the speed increase and reduction operations are not produced, so that the change gear ratio comes to "1". For example, the first to third clutch means K1, K2 and K3 are engaged to cause a drive force from the input shaft 4 to transmit to the output shaft 5 without taking place the power circulation.

Fifth gear

The second and third clutch means K2, K3 and the second brake means B2 are engaged. That is, under the fourth gear condition, the first to third clutch means K1 to K3 are engaged. Then, under such the engaged condition, the second brake means B2 is engaged instead of the first clutch means K1. Thus, in the third planetary gear set 3, since the carrier 3C rotates together with the input shaft 4 under the condition that the sun gear 3S is held stationary, the ring gear 3R is rotated forward faster than the input shaft 4. Further, in this case, the carrier 2C in the second planetary gear set 2 is in a condition to disconnect from the input shaft 4, and the ring gear 1R of the first planetary gear set 1 is connected to the ring gear 2R, so that the first and second planetary gear sets 1, 2 do not particularly perform the speed increase and reduction operations. As a result, the rotation of the input shaft 4 is substantially overdriven only by the third planetary gear set 3 to be transmitted to the output shaft 5. As shown on Table 1, the change gear ratio is represented as follows:

$$1/(1+\rho_3)$$

and the specified value thereof comes to 0.733. Also, the power circulation does not take place in this case.

Reverse gear

The third and fourth clutch means K3, K4 and the first brake means B1 are engaged. That is, the sun gear 3S of the third planetary gear set 3 and the sun gear 2S of the second planetary gear set 2 are connected to the input shaft 4, while the carrier 3C of the third planetary gear set 3 and the sun gear 1S of the first planetary gear set 1 are held stationary. In this case, since the ring gear 2R of the second planetary gear set 2 is in a condition to disconnect from the input shaft 4, the first and second planetary gear sets 1, 2 are not particularly associated with the speed increase and reduction operations similarly to the case of the fifth gear. And, in the third planetary gear set 3, sun gear 3S rotates together with the input shaft 4 under the condition that the carrier 3C is held stationary, the ring gear 3R is rotated in the reverse direction slower than the input shaft 4. Namely, in this case, the rotation of the input shaft 4 is retarded and reversed substantially only by the third planetary gear set 3 to be transmitted to the output shaft 5, so that the reverse is provided. As shown on Table 1, the change gear ratio in this case is represented as follows:

$$-1/\rho_3$$

and the specified value thereof comes to $-2.740$. Further, the power circulation does not take place even in this case.

As is apparent from the description on each of first to fifth forward speeds and reverse, the automatic transmission shown in FIG. 1 is permitted to set the change gear ratios in the forward speeds to be approximately relevant to the geometric series when five forward speeds and one reverse are set, so that a drive force before and after the gear change is free from the remarkable reduction and the power performance of a vehicle is improved. Further, since the gear ratios of the respective planetary gear sets 1, 2, 3 are set to the proper values within the range of about 0.31 to 0.40, the diameter of the planetary gear set is not enlarged to provide a compact speed change gear. As is apparent from the description on the respective gears, it suffices for the gear change to the other adjacent gear to release either one engaging means and engage the other engaging means, i.e., the gear change in the forward speed is performed by changing over two engaging means, so that the control for the gear change is facilitated, while it is advantageous to the reduction of shocks. Further, since the power circulation does not take place, the efficiency of transmitting the drive force is improved, and a compact automatic transmission excellent in durability is obtained by the reasons why the relative rotational frequency of the pinion gears is reduced, the load torque of each of the gears and engaging means are small and the rotational frequency of each gear is reduced. And, the change gear ratio on the overdrive is set to about 0.733 to improve the power performance, the fuel consumption and the silence property in high speed travelling, and the change gear ratio on the reverse is set to about $-2.740$ to ensure a sufficient drive force. Further, since the input and output shafts 4, 5 are disposed on the same axis, an automatic transmission suitably used in FR car (front engine rear drive car) is provided.

Also, in the embodiment shown in FIG. 1, it is possible to set other two gears, in addition to the above-mentioned gears. Each value of the change gear ratios of these two gears is defined as a value between the second gear and the third gear and a value between the third gear and the fourth gear. These values are represented as the 2.5th gear and the 3.5th gear as shown on the lower stage of Table 1.

2.5th gear

This gear corresponds to the gear between the second gear and the third gear, and the first and fourth clutch means K1 and K4 and the second brake means B2 are engaged. Thus, under the condition that the sun gear 3S of the third planetary gear set 3 is held stationary by the second brake means B2 and the sun gear 2S of the second planetary gear set 2 is held stationary by the second brake means B2 through the fourth clutch means K4, the carrier 2C of the second planetary gear set 2 rotates together with the input shaft 4. For that end, the ring gear 2R in the second planetary gear set 2 is rotated forward slower than the input shaft 4, whereas the ring gear 1R in the first planetary gear set 1 is rotated forward together with the ring gear 2R of the second planetary gear set 2 and slower than the input shaft 4. However, the carrier 1C is connected integrally to the ring gear 3R of the third planetary gear set 3 and the output shaft 5, the sun gear 1S is connected to the carrier 3C of the third planetary gear set 3 and further the sun gear 3S of the third planetary gear set 3 is held stationary, so that the sun gear 1S of the first planetary gear set 1 is rotated forward more slowly than the ring gear 1R and the carrier 1C is rotated forward at an intermediate speed between that of the ring gear 1R and that of the sun gear 1S. Also, the ring gear 3R in the third planetary gear set 3 is rotated forward slower than the input shaft 4, and the carrier 3C is rotated forward more slowly than the ring gear 3R. As a result, in this case, the first to third planetary gear sets 1, 2 and 3 perform the retarding operations in cooperation with each other, whereby the rotation of the input shaft 4 is retarded to be transmitted to the output shaft 5. As shown on Table 1 the value of the change gear ratio is represented as follows:

$$(1+\rho_3+\rho_1\rho_3)(1-\rho_2)(1+\rho_3)$$

and the specified value thereof comes to 1.611. In this case, the power circulation does not take place.

3.5th gear

This gear corresponds to the gear between the third gear and the fourth gear, and the first and third clutch means K1, K3 and the second brake means B2 are engaged. That is, the carrier 2C and the sun gear 2S of the second planetary gear set 2 are connected to the input shaft 4, and the sun gear 3S of the third planetary gear set 3 is held stationary. Thus, since two components of the second planetary gear set 2 rotate together with the input shaft 4, the whole second planetary gear set 2 is rotated forward as a single unit at the same speed as the input shaft 4, and accordingly the ring gear 1R of the first planetary gear set 1 is rotated forward at the same speed as the input shaft 4. Also, the connected and stationary conditions of the respective components of the first and third planetary gear sets 1, 3 are similar to those of the 2.5th gear, and thus the respective components of the first and third planetary gear sets 1, 3 rotate somewhat faster than those in the case of the 2.5th gear. In other words, this forward 3.5th gear is in a condition that the retarding operation of the second planetary gear set 2 is eliminated under the 2.5th gear condition to make the second planetary gear set 2 rotate as a single unit. Hence, as shown on Table 1, the change gear ratio is represented as follows:

$$(1+\rho_3+\rho_1\rho_3)/(1+\rho_3)$$

and the specified value thereof comes to 1.106. In this case, the power circulation also does not take place.

Now, in the embodiment shown in FIG. 1, the respective planetary gear sets 1, 2, 3 are arranged in the mentioned order from the side of the input shaft 4, this arrangement may be altered at will so long as the connecting condition of the respective components is maintained as noted above. The altered arrangements are shown in FIGS. 2 to 4.

Figure 2:
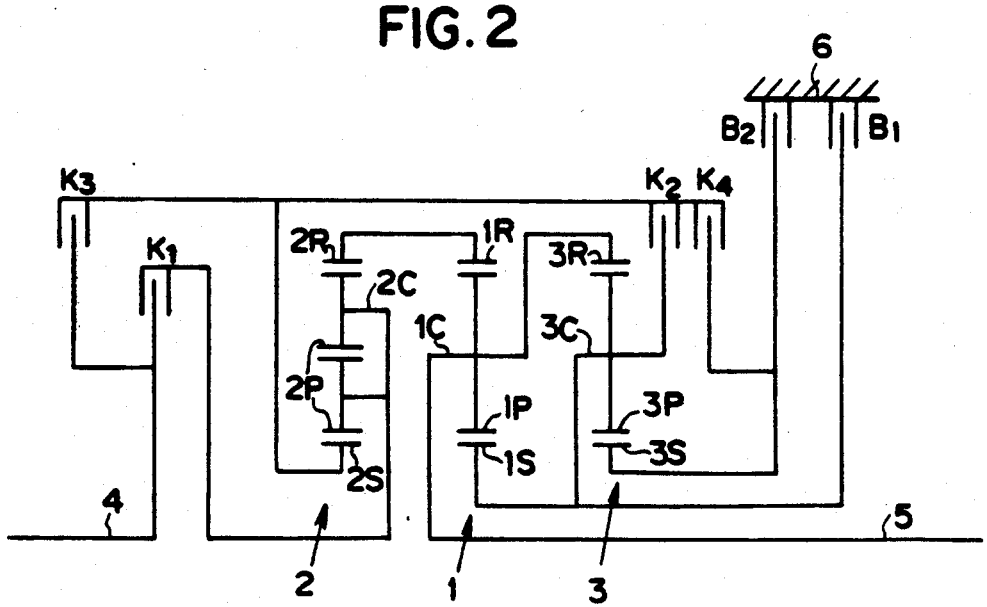

That is, in the embodiment shown in FIG. 2, the second planetary gear set 2, which is a double pinion type planetary gear set, is disposed on the side of the input shaft 4, and the first and third planetary gear set 1 and 3 following the second planetary gear set 2 are sequentially arranged Further, first and third clutch means K1, K3 are arranged on the side of the input shaft 4 from the second planetary gear set 2, and the other clutch means K2, K4 and the brake means B1, B2 are arranged on the side opposite to the input shaft 4 through the gear train.

Figure 3:
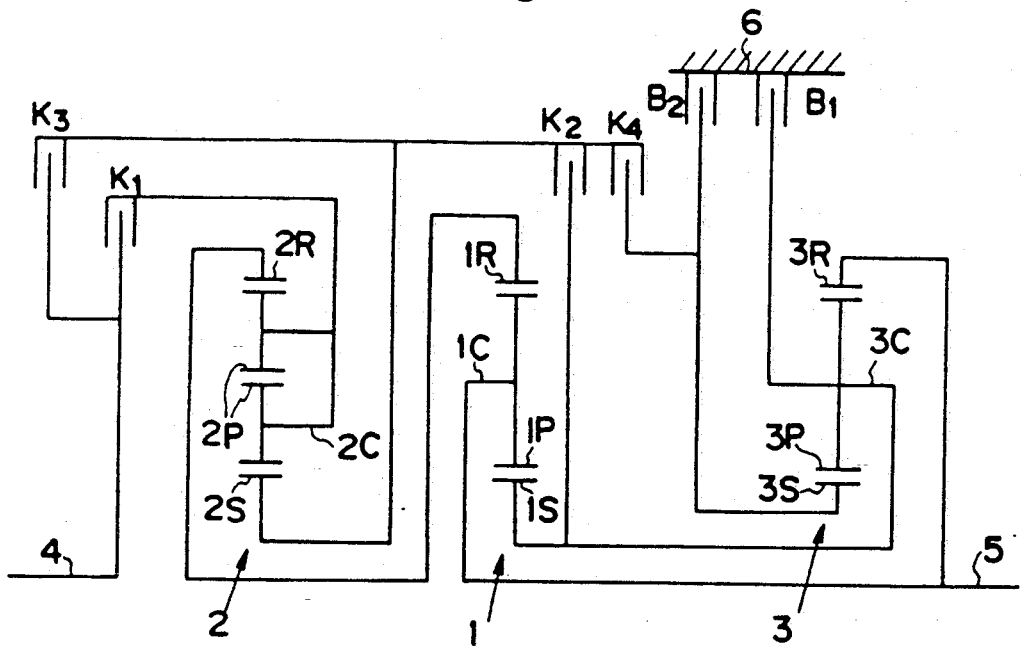

Also, in the embodiment shown in FIG. 3, the second, first and third planetary gear sets 2, 1 and 3 are arranged in the mentioned order from the side of the input shaft 4, while the second and fourth clutch means K2, K4 and the brake means B1, B2 are disposed respectively between the first and third planetary gear sets 1, 3.

Figure 4:
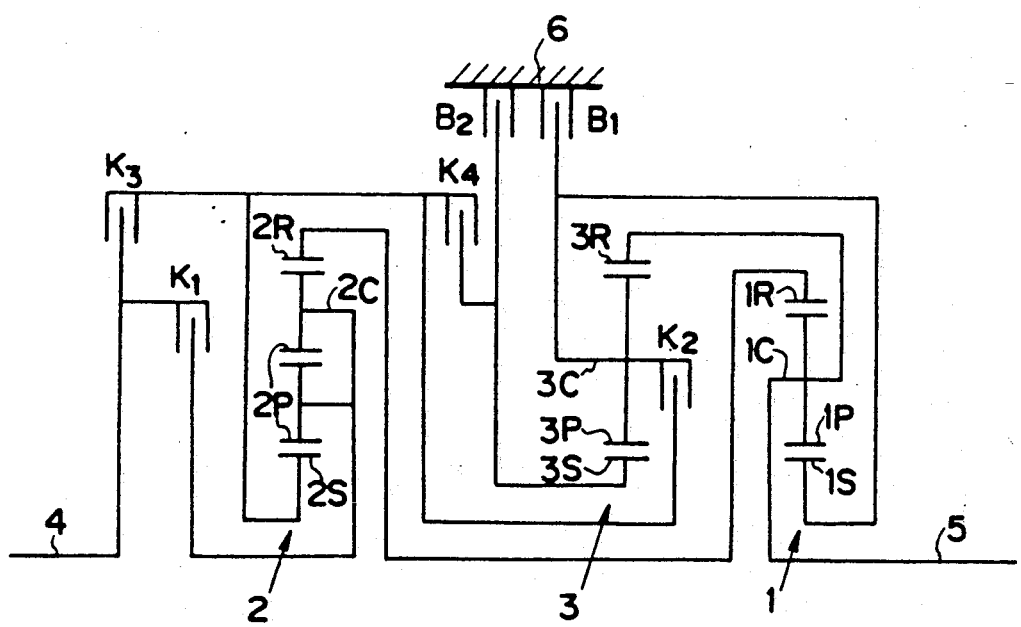

Further, in the embodiment shown in FIG. 4, the second, third and first planetary gear sets 2, 3 and 1 are arranged in the mentioned order from the side of the input shaft 4, while the fourth clutch means K4 and the brake means B1, B2 are disposed between the second and third planetary gear sets 2, 3, and the second clutch means K2 is disposed between the first and third planetary gear sets 1, 3.

Even in the automatic transmission constituted as shown in FIGS. 2, 3 and 4, similarly to the automatic transmission shown in FIG. 1, the five forward speeds and one reverse or seven forward speeds and one reverse, in which the 2.5th gear and 3.5th gear are added to the five forward speeds.

Figure 5:
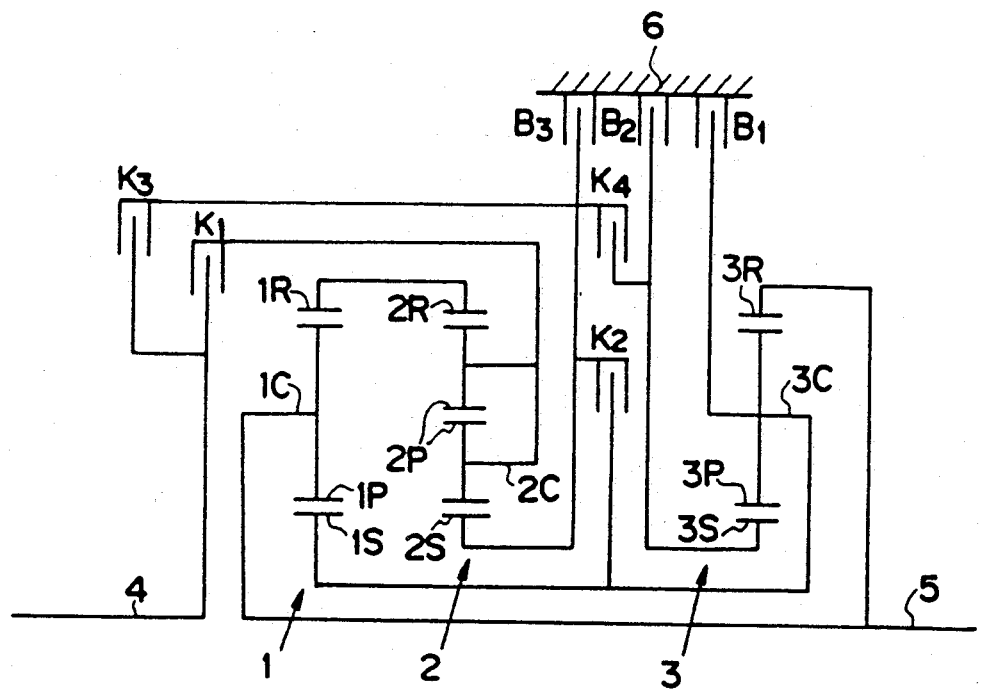

In the automatic transmission constituted as shown in FIGS. 1 to 4, the sun gear 2S of the second planetary gear set 2 is held stationary by engaging the second clutch means K2 along with the first brake means B1 in the second gear, so that a load is engaged to the second clutch means K2. It suffices for the removal of the load on the second clutch means K2 to additionally provide a brake for holding the sun gear 2S of the second planetary gear set 2 stationary in the second gear. FIG. 5 shows the embodiment, which is similar to that in FIG. 1, except that the third brake means B3 is additionally provided between the sun gear 2S of the second planetary gear set 2 and the casing 6. Table 2 shows the operation of this embodiment.

TABLE 2

|     | clutch means | | | | brake means | | |
| --- | --- | --- | --- | --- | --- | --- | --- |
|     | K1 | K2 | K3 | K4 | B1 | B2 | B3 |
| 1st | ○ | X | X | ○ | ○ | X | X |
| 2nd | ○ | ○* | X | X | ○* | X | ○* |
| 3rd | ○ | X | ○ | X | ○ | X | X |
| 4th | ○*1 | ○*1 | ○*1 | ○*1 | X | X | X |

TABLE 2-continued

| | clutch means | | | | brake means | | |
|---|---|---|---|---|---|---|---|
| | K1 | K2 | K3 | K4 | B1 | B2 | B3 |
| 5th | X | ○ | ○ | X | X | ○ | X |
| Rev | X | X | ○ | ○*2 | ○ | X | X |
| 2.5th | ○ | X | X | X*2 | X | ○*2 | ○*2 |
| 3.5th | ○ | X | ○ | X | X | ○ | X |

*At least two may be engaged.
*1At least three may be engaged.
*2Either two among three may be engaged.

Further, in the following embodiments, it is possible to set the five to seven forward speeds and one reverse. On Table 2 and the subsequent tables showing the operation of the automatic transmission, the 2.5th gear and 3.5th gear are represented as the gear to be added to the five forward speeds and one reverse set as the basic gears. When the automatic transmission is so constituted to set the seven forward speeds and one reverse, the 2.5th gear corresponds to the third gear and the 3.5th gear corresponds to the fifth gear. Also, as is apparent from Table 2, in the embodiment shown in FIG. 5, if the gear change is made between the first gear and the second gear and the second gear and the third gear, the second clutch means K2 is kept releasing, while the third brake means B3 is engaged or released to perform the gear change without using the second clutch means K2.

Figure 6:
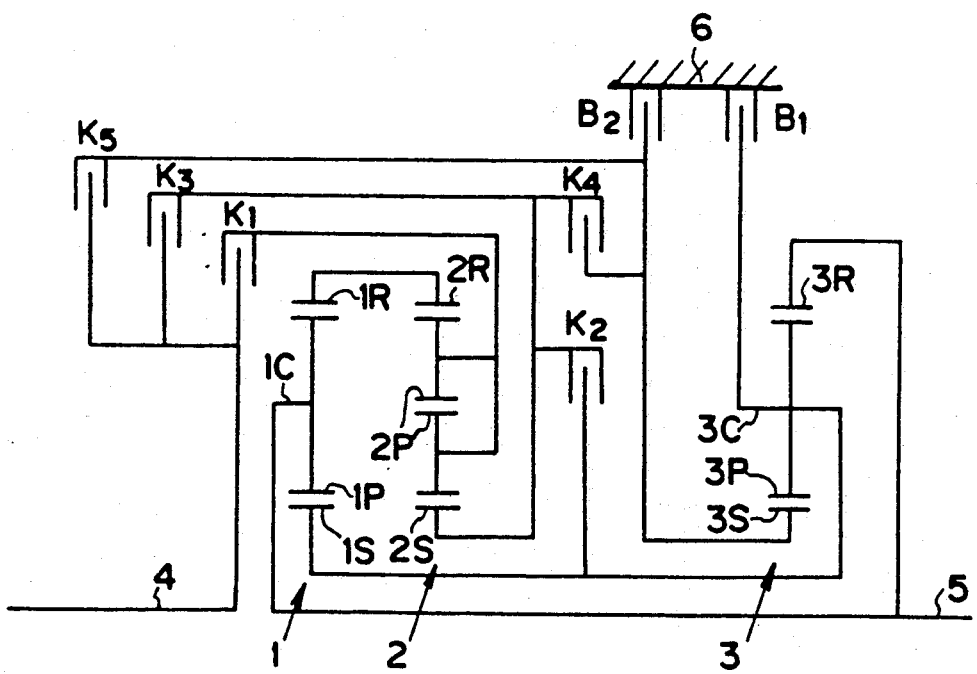

In the automatic transmission as shown in FIGS. 1 to 5, even though the sun gear 2S of the second planetary gear set 2 is connected to the input shaft 4 in the reverse, only the third planetary gear set 3 substantially performs the retarding operation. Thus, according to the present invention, the sun gear 3S of the third planetary gear set 3 may be connected directly to the input shaft 4 in the reverse. FIG. 6 shows the embodiment, which is similar to that in FIG. 1, except that fifth clutch means K5 is interposed between the sun gear 3S of the third planetary gear set 3 and the input shaft 4. Table 3 shows the operation of the automatic transmission shown in FIG. 6. In this automatic transmission, it is possible to set the five forward speeds and one reverse or the seven forward speeds and one reverse, and it is advantageous in the durability since the rotational frequency of the sun gear 2S and the relative rotational frequency of the pinion gear to the carrier 2C of the second planetary gear set 2 in the reverse are reduced.

TABLE 3

| | clutch means | | | | brake means | |
|---|---|---|---|---|---|---|
| | K1 | K2 | K3 | K4 | K5 | B1 | B2 |
| 1st | ○ | X | X | ○ | X | ○ | X |
| 2nd | ○ | ○ | X | X | X | ○ | X |
| 3rd | ○ | X | ○ | X | X | ○ | X |
| 4th | ○* | ○* | ○* | X* | X* | X | X |
| 5th | X | ○ | ○ | X | X | X | ○ |
| Rev | X* | ○* | X* | X* | ○* | ○ | X |
| 2.5th | ○ | X | X | ○ | X | X | ○ |
| 3.5th | ○ | X | ○ | X | X | X | ○ |

*Engaged and released conditions of these clutches do not necessarily need to be as shown on Table 3, but the pertinent gear is set according to combinations of a plurality of engaged and released conditions.

Figure 7:
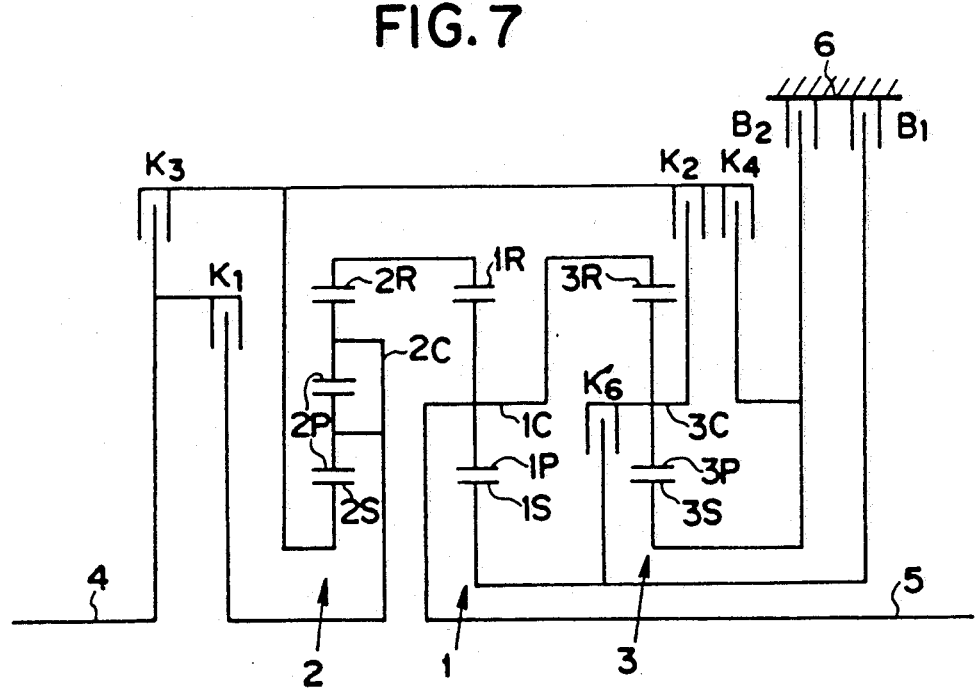
Figure 8:
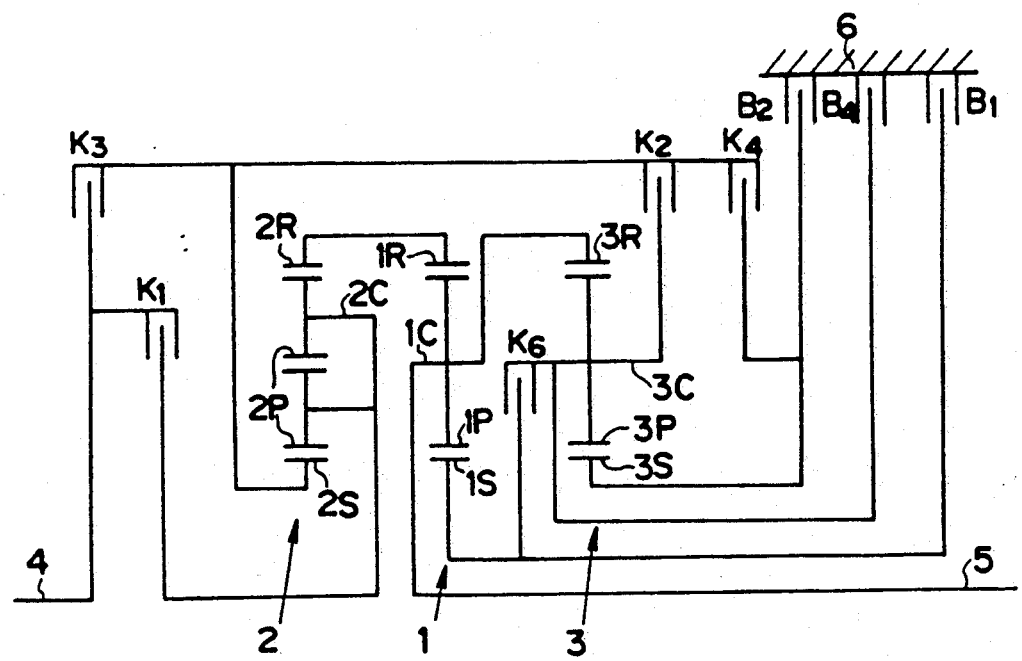
Figure 9:
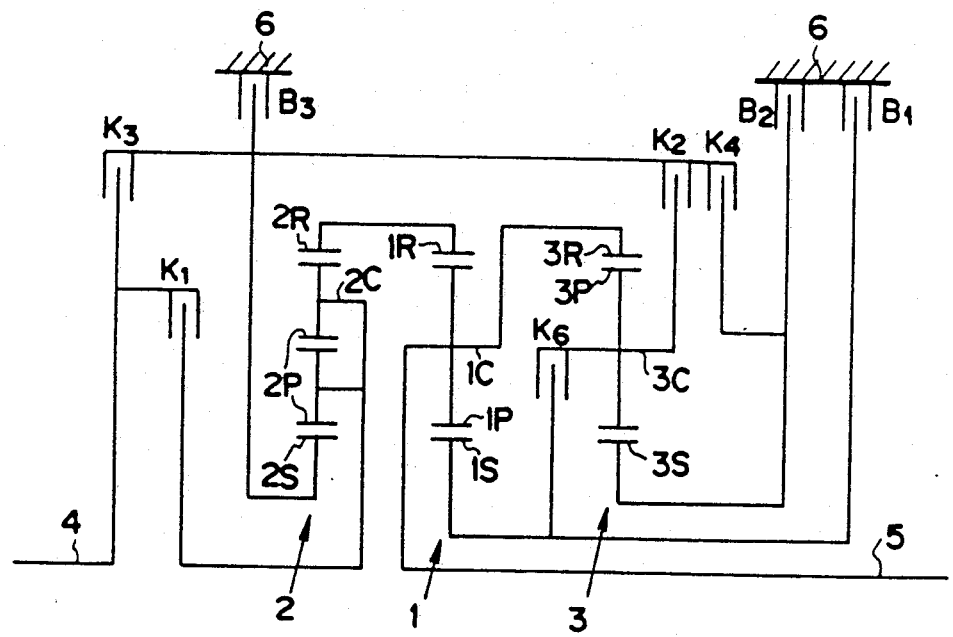

Now, the automatic transmission, though it uses three planetary gear sets, do not always have all planetary gear sets associated with the transmission of a torque, but may have the planetary gear set simply idling on the predetermined gear. That is, in the respective embodiments as shown in FIGS. 1 to 6, when the first and third clutch means K1, K3 and the first brake means B1 are engaged to set the third gear, the whole second planetary gear set 2 rotates as a single unit, whereas in the third planetary gear set 3, the ring gear 3R rotates forward slower than the input shaft 4 under the condition that the carrier 3C is held stationary, so that the sun gear 3S is reversed. Thus, the relative rotational frequency of the sun gear 2S of the second planetary gear set 2 to the sun gear 3S of the third planetary gear set 3, which are connected to each other through the fourth clutch means K4, is increased. As a result, if a multi-disc clutch is used for the fourth clutch means K4, the relative rotational frequency of the clutch disk to the clutch plate is increased to increase a so-called drag loss, while degrading the durability disadvantageously. Also, if a one-way clutch is used, the relative rotational frequency of an inner race to an outer race is increased in the third gear to degrade the durability disadvantageously. When sixth clutch means K6 is additionally provided as shown in FIGS. 7 to 9 for example, the sun gears 2S, 3S of the second and third planetary gear sets 2, 3 are permitted to rotate at the equal speed by disconnecting the carrier 3C of the third planetary gear set 3 from the sun gear 1S of the first planetary gear set 1 and connecting the sun gear 3S of the third planetary gear set 3 to the input shaft 4 through the third and fourth clutch means K3, K4 in the third gear. Also, at the same time, the relative rotational frequency of the pinion gear 3P to the carrier 3C in the third planetary gear set 3 is reduced.

That is, the embodiment shown in FIG. 7 is similar to that in FIG. 2, except that the sixth clutch means K6 is additionally provided between the sun gear 1S of the first planetary gear set 1 and the carrier 3C of the third planetary gear set 3. Table 4 shows the operation of this embodiment.

TABLE 4

| | clutch means | | | | | brake means | |
|---|---|---|---|---|---|---|---|
| | K1 | K2 | K3 | K4 | K6 | B1 | B2 |
| 1st | ○ | X | X | ○ | ○ | ○ | X |
| 2nd | ○ | X* | X | ○* | X* | ○ | ○* |
| 3rd | ○ | X* | ○ | ○* | X* | ○ | X* |
| 4th | ○* | ○* | ○* | ○* | ○* | X* | X |
| 5th | X* | ○ | ○ | X | ○* | X* | ○ |
| Rev | X | X | ○ | ○ | ○ | ○ | X |
| 2.5th | ○ | X | X | ○ | ○ | X | ○ |
| 3.5th | ○ | X | ○ | X | ○ | X | ○ |

*These engaged and released conditions do not necessarily need to be as shown on Table 4, but the pertinent gear is permitted to set according to the combination of a plurality of other engaged and released conditions.

Also, the embodiment shown in FIG. 8 is similar to that in FIG. 7, except that fourth brake means B4 for blocking the carrier 3C of the third planetary gear set 3 from unnecessary rotation is additionally provided between the carrier 3 and the casing 6. Table 5 shows the operation of the embodiment of FIG. 8.

TABLE 5

| | clutch means | | | | | brake means | | |
|---|---|---|---|---|---|---|---|---|
| | K1 | K2 | K3 | K4 | K6 | B1 | B2 | B4 |
| 1st | ○ | X | X | ○ | X* | ○* | X | ○* |
| 2nd | ○ | X* | X | ○* | X* | ○* | ○* | X* |
| 3rd | ○ | X* | ○ | ○* | X* | ○* | X* | X |
| 4th | ○* | ○* | ○* | ○* | ○* | X* | X | X |
| 5th | X* | ○ | ○ | X | ○* | X* | ○ | X |
| Rev | X* | X | ○ | ○ | X* | ○ | X* | ○* |
| 2.5th | ○ | X | X | ○ | ○ | X | ○ | X |

TABLE 5-continued

|  | clutch means | | | | | brake means | | |
|---|---|---|---|---|---|---|---|---|
|  | K1 | K2 | K3 | K4 | K6 | B1 | B2 | B4 |
| 3.5th | ○ | X | ○ | X | ○ | X | ○ | X |

*These engaged and released conditions do not necessarily need to be as shown on Table 5, but the pertinent speed is permitted to set according to the combination of a plurality of other engaged and released conditions.

Further, the embodiment shown in FIG. 9 is similar to that in FIG. 7, except that third brake means B3 for blocking the sun gear 2S of the second planetary gear set 2 from the rotation is additionally interposed between the sun gear 2S and the casing 6. Table 6 shows the operation of the embodiment of FIG. 9.

TABLE 6

|  | clutch means | | | | | brake means | | |
|---|---|---|---|---|---|---|---|---|
|  | K1 | K2 | K3 | K4 | K6 | B1 | B2 | B3 |
| 1st | ○ | X | X | ○ | ○ | ○ | X | X |
| 2nd | ○ | X* | X | X* | X* | ○* | ○* | ○* |
| 3rd | ○ | X* | ○ | X* | ○* | ○ | X* | X |
| 4th | ○* | ○* | ○* | ○* | ○* | X* | X | X |
| 5th | X* | ○ | ○ | X | ○* | X* | ○ | X |
| Rev | X | X | ○ | ○ | ○ | ○ | X | X |
| 2.5th | ○ | X | X | X*1 | ○ | X | ○*1 | ○*1 |
| 3.5th | ○ | X | ○ | X | ○ | X | ○ | X |

*These engaged and released conditions do not necessarily need to be as shown on table 6, but the pertinent gear is permitted to set according to the combination of a plurality of other engaged and released conditions.
*1 At least either two out of three may be engaged.

Also, according to the present invention, proper engaging means among the respective engaging means as noted above may be selectively combined for use, and the embodiment will be hereinafter shown.

Figure 10:
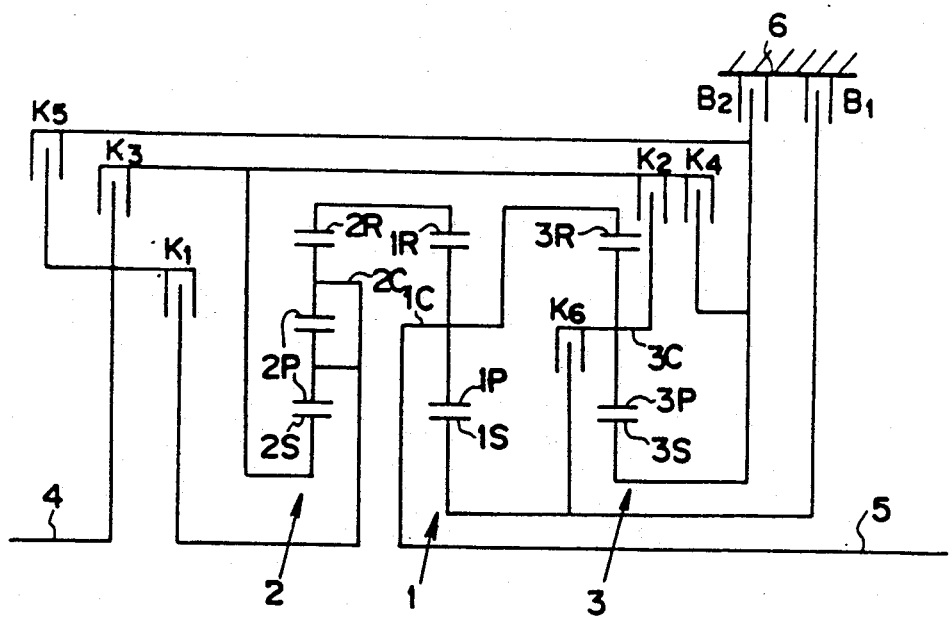

That is, the embodiment shown in FIG. 10 is similar to that in FIG. 7, except that fifth clutch means K5 is additionally provided to directly connect the sun gear 3S of the third planetary gear set 3 to the input shaft 4. Table 7 shows the operation of the embodiment of FIG. 10.

TABLE 7

|  | clutch means | | | | | | brake means | |
|---|---|---|---|---|---|---|---|---|
|  | K1 | K2 | K3 | K4 | K5 | K6 | B1 | B2 |
| 1st | ○ | X | X | ○ | X | ○ | ○ | X |
| 2nd | ○ | X* | X | ○* | X | X* | ○ | ○* |
| 3rd | ○ | X* | ○* | X* | ○* | X* | ○* | X* |
| 4th | ○* | ○* | ○* | ○* | ○* | ○* | X* | X |
| 5th | X* | ○ | ○ | X | X | ○* | X* | ○ |
| Rev | X* | ○* | X* | X* | ○* | ○ | ○ | X |
| 2.5th | ○ | X | ○ | X | X | ○ | X | ○ |
| 3.5th | ○ | X | ○ | X | X | ○ | X | ○ |

*These engaged and released conditions do not necessarily need to be as shown on Table 7, but the pertinent gear is permitted to set according to the combination of a plurality of other engaged and released conditions.

Figure 11:
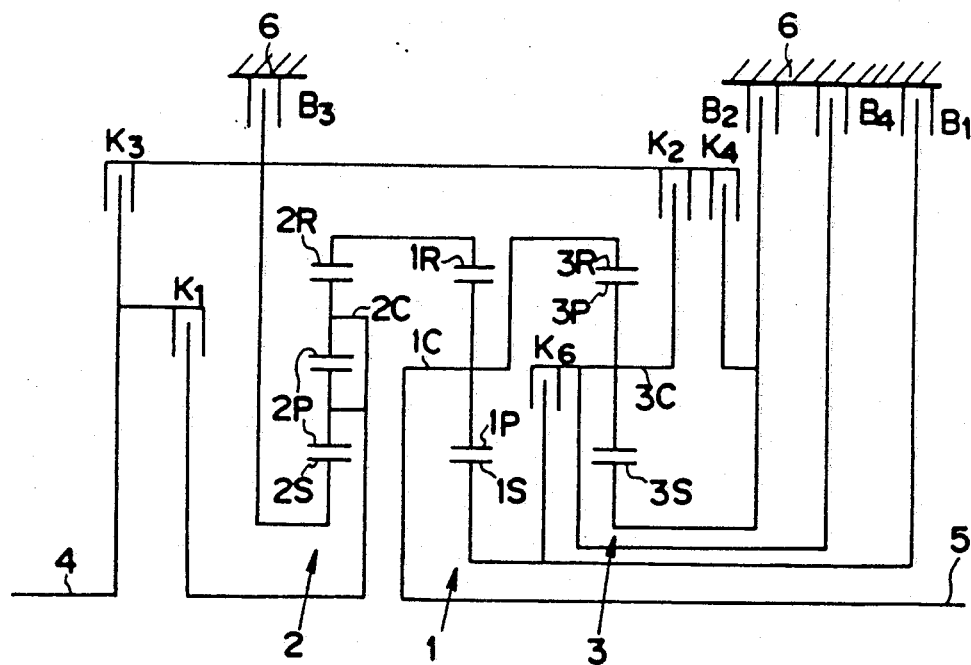

The embodiment shown in FIG. 11 is similar to that in FIG. 8, except that the third brake means B3 is additionally provided, or similar to that in FIG. 9, except that the fourth brake means B4 is additionally provided to selectively hold the sun gear 2S of the second planetary gear set 2 and the carrier 3C of the third planetary gear set 3 stationary. Table 8 shows the operation of the embodiment of FIG. 11.

TABLE 8

|  | clutch means | | | | | brake means | | |
|---|---|---|---|---|---|---|---|---|
|  | K1 | K2 | K3 | K4 | K6 | B1 | B2 | B3 | B4 |
| 1st | ○ | X | X | ○ | X* | ○* | X | X | ○* |
| 2nd | ○ | X* | X | X* | X* | ○* | ○* | ○* | X* |
| 3rd | ○ | X* | ○ | ○* | X* | ○* | X* | X | X* |
| 4th | ○* | ○* | ○* | ○* | ○* | X* | X | X | X |
| 5th | X* | ○ | ○ | X | ○* | X* | ○ | X | X |
| Rev | X* | X | ○ | ○ | X* | ○* | X | X | ○* |
| 2.5th | ○ | X | X | ○*1 | ○ | X | X*1 | ○*1 | X |
| 3.5th | ○ | X | ○ | X | ○ | X | ○ | X | X |

*These engaged and released conditions do not necessarily need to be as shown on Table 8, but the pertinent gear is permitted to set according to the combination of a plurality of other engaged and released conditions.
*1 At least either two out of three may be engaged.

Figure 12:
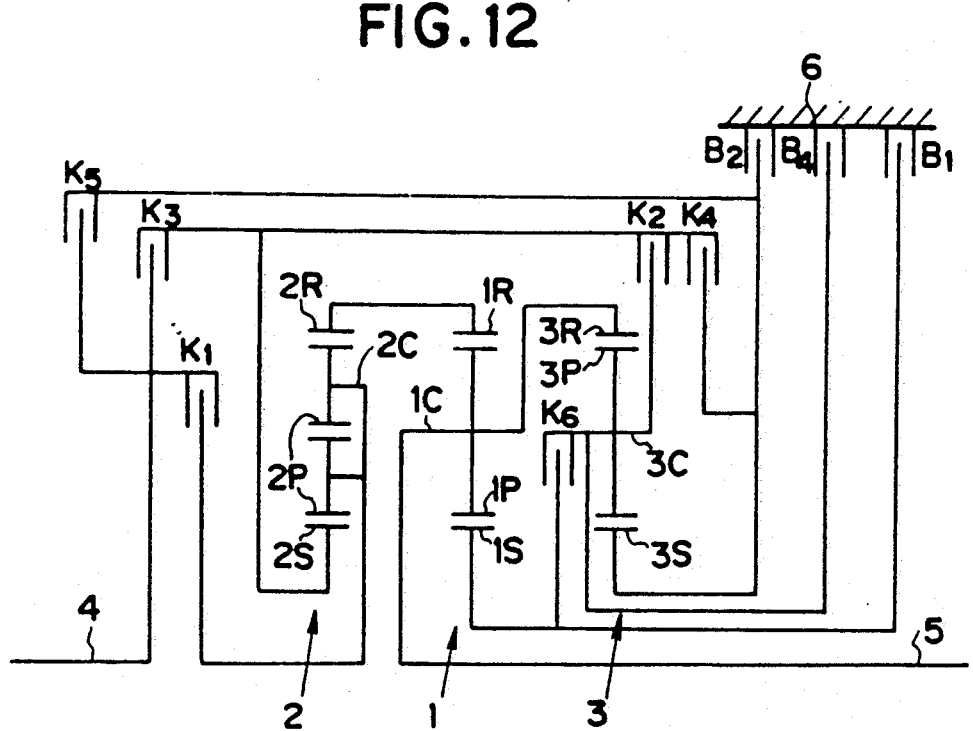

The embodiment shown in FIG. 12 is similar to that in FIG. 10, except that the fourth brake means B4 is further provided to selectively hold the carrier 3C of the third planetary gear set 3 stationary. Table 9 shows the operation of the embodiment of FIG. 12.

TABLE 9

|  | clutch means | | | | | | brake means | | |
|---|---|---|---|---|---|---|---|---|---|
|  | K1 | K2 | K3 | K4 | K5 | K6 | B1 | B2 | B4 |
| 1st | ○ | X | X | ○ | X | X* | ○* | X | ○* |
| 2nd | ○ | X* | X | ○* | X | X* | ○* | ○* | X* |
| 3rd | ○ | X* | ○* | X* | ○* | X* | ○* | X* | X* |
| 4th | ○* | ○* | ○* | ○* | ○* | ○* | X* | X | X |
| 5th | X* | ○ | ○ | X | X | ○* | X* | ○ | X |
| Rev | X* | ○* | X* | X* | ○* | X* | ○* | X | ○* |
| 2.5th | ○ | X | X | ○ | X | ○ | X | ○ | X |
| 3.5th | ○ | X | ○ | X | X | ○ | X | ○ | X |

*These engaged and released conditions do not necessarily need to be as shown on Table 9, but the pertinent gear is permitted to set according to the combination of a plurality of other engaged and released conditions.

Figure 13:
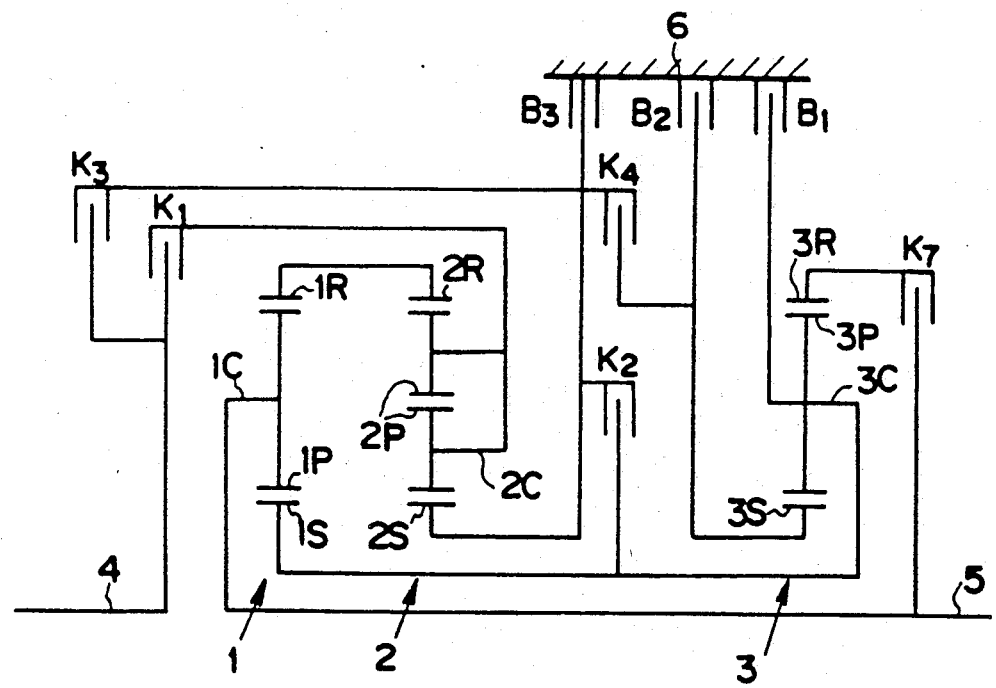

The embodiment shown in FIG. 13 is similar to that in FIG. 5, except that seventh clutch means K7 for selectively connecting the ring gear 3R of the third planetary gear set 3 to the output shaft 5 or the carrier 1C of the first planetary gear set 1 is additionally provided. Table 10 shows the operation of the embodiment of FIG. 13.

TABLE 10

|  | clutch means | | | | | brake means | | |
|---|---|---|---|---|---|---|---|---|
|  | K1 | K2 | K3 | K4 | K7 | B1 | B2 | B3 |
| 1st | ○ | X | X | ○ | X | ○ | X | X |
| 2nd | ○ | X* | X | ○* | X* | ○* | X* | ○* |
| 3rd | ○ | X*1 | ○ | ○*1 | X*1 | ○ | X*1 | X |
| 4th | ○*2 | ○*2 | ○*2 | ○*2 | ○*2 | X | X*2 | X |
| 5th | X*3 | ○ | ○ | X | ○*3 | X | ○ | X |
| Rev | X*3 | X | ○ | ○ | ○*3 | ○ | X | X |
| 2.5th | ○ | X | X | ○*4 | ○ | X | ○*4 | X*4 |
| 3.5th | ○ | X | ○ | X | ○ | X | ○ | X |

*The engaged and released conditions of these means do not necessarily need to be as shown on Table 10, but the combination of other engaged and released conditions is possible.
*1 Either one may be engaged.
*2 When K1, K2 and K3 are engaged, K4 or K7 is engaged, or B2 is engaged instead of these two clutch means, and when K4 K7 are engaged, at least either two out of other clutch and means may be engaged.
*3 Either one may be engaged.
*4 Either two or more out of three may be engaged.

Figure 14:
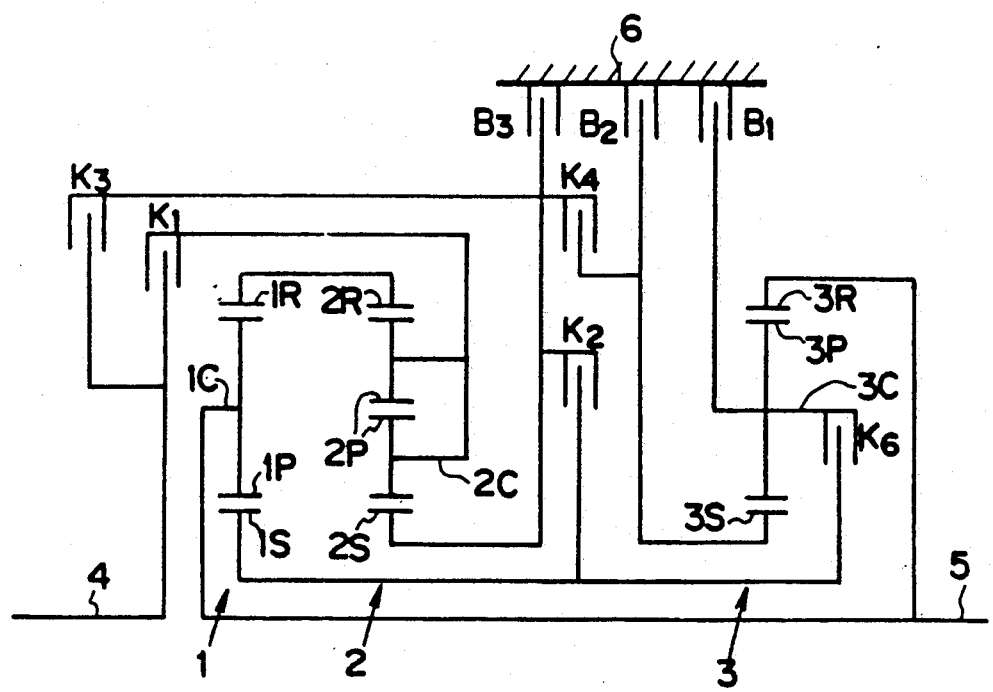

The embodiment shown in FIG. 14 is similar to that in FIG. 5, except that sixth clutch means K6 for selectively connecting the sun gear 1S of the first planetary gear set 1 to the carrier 3C of the third planetary gear set 3 is additionally provided. Table 11 shows the operation of the embodiment of FIG. 14.

TABLE 11

|  | clutch means | | | | | brake means | | |
|---|---|---|---|---|---|---|---|---|
|  | K1 | K2 | K3 | K4 | K6 | B1 | B2 | B3 |
| 1st | ○ | X | X | ○ | ○ | ○ | X | X |

TABLE 11-continued

| | clutch means | | | | | brake means | | |
|---|---|---|---|---|---|---|---|---|
| | K1 | K2 | K3 | K4 | K6 | B1 | B2 | B3 |
| 2nd | ○ | X* | X | ○* | X* | ○* | X* | ○* |
| 3rd | ○ | X | ○ | X | ○ | ○ | X | X |
| 4th | ○*1 | ○*1 | ○*1 | ○*1 | ○*1 | X | X*1 | X |
| 5th | X | ○ | ○ | X | ○ | X | ○ | X |
| Rev | X | X | ○ | ○ | ○ | ○ | X | X |
| 2.5th | ○ | X | X | X*2 | ○ | X | ○*2 | ○*2 |
| 3.5th | ○ | X | ○ | X | ○ | X | ○ | X |

*The engaged and released conditions of these means do not necessarily need to be as shown on Table 11, but the combination of other engaged and released conditions is possible.
*¹K1, K2 and K3 are engaged, or, K4 or K6 is engaged or B2 is engaged instead of K4, K6, in addition to K1 through K3. Further, when K4 and K6 are engaged, at least other two clutch means may be engaged.
*²Either two out of three may be engaged.

Figure 15:
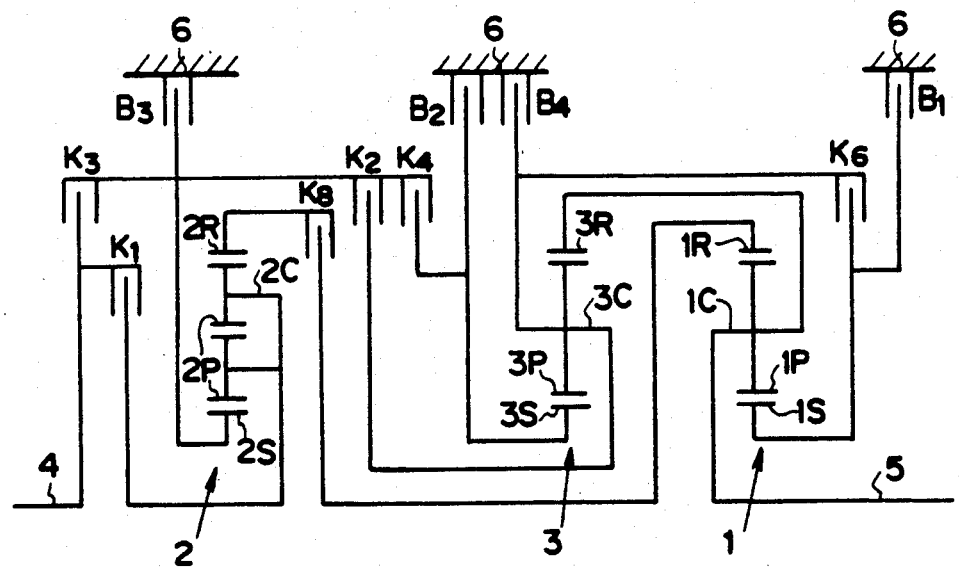

The embodiment shown in FIG. 15 is so constituted that the first through third planetary gear sets 1 through 3 are arranged in the order of the second, third and first planetary gear sets from the side of the input shaft 4 and, in addition to the first through fourth clutch means K1 through K4, the sixth clutch means K6 and the first through fourth brake means B1 through B4, eighth clutch means K8 for selectively connecting the ring gear 2R of the second planetary gear set 2 and the ring gear 1R of the first planetary gear set 1 is provided between these ring gears 2R, 1R. Table 12 shows the operation of the automatic transmission in accordance with the embodiment shown in FIG. 15.

TABLE 12

| | clutch means | | | | | | brake means | | | |
|---|---|---|---|---|---|---|---|---|---|---|
| | K1 | K2 | K3 | K4 | K6 | K8 | B1 | B2 | B3 | B4 |
| 1st | ○ | X | X | ○ | X* | ○ | ○* | X | X | ○* |
| 2nd | ○ | ○*1 | X | X*1 | X*1 | ○ | ○*1 | X*1 | X*1 | ○* |
| 3rd | ○ | X*1 | ○ | ○ | X*1 | ○ | ○*1 | X*1 | X | X*1 |
| 4th | ○*1 | ○*1 | ○*1 | ○*1 | ○*1 | ○*1 | X*1 | X | X | X |
| 5th | ○*1 | ○ | ○ | X | X*1 | X*1 | X*1 | ○ | X | X |
| Rev | ○*1 | X | ○ | ○ | ○*1 | X*1 | ○*1 | X | X | X*1 |
| 2.5th | ○ | X | X | ○* | ○ | ○ | X | ○* | X* | X |
| 3.5th | ○ | X | ○ | X | ○ | ○ | X | ○ | X | X |

*Either two or more out of three may be engaged.
*¹These engaged and released conditions do not necessarily need to be as shown on Table 12, but the pertinent gear is permitted to set according to the combination of a plurality of other engaged and released conditions.

Further, as is apparent from Table 12, in the embodiment shown in FIG. 15, the first clutch means K1 is possible to be normally engaged, so that the first clutch means K1 is possible to be eliminated from the constitution of FIG. 15 to normally connect the input shaft 4 to the carrier 2C of the second planetary gear set 2. Table showing the operation of this case is equal with Table 12, from which the column K1 is removed.

Now, in the respective embodiments as noted above, each of the clutch means K1 through K8 and each of the brake means B1 through B4 are represented by the symbol of a multi-disc clutch or a multi-disc brake. However, according to the present invention, engaging means having one-way property is possible to be used for the clutch means and the brake means in order to facilitate the control for gear change or to damp the shocks. The engaging means having one-way property described herein includes a well-known one-way clutch provided with rollers such as sprags or a band brake varying the torque capacity depending on the direction of applying a load. The one-way engaging means of this type is simply used or it is used together with the multi-disc clutch or the multi-disc brake to thereby reduce the number of engaging means to be controlled the change over of the engaged and released conditions when gear change is made, or to automatically change over the engaged and released conditions with a change of load torque, so that the shocks are reduced. To generate such the operation, the members connected to each other through the one-way engaging means are necessary to rotate in the same direction (including the stationary condition) immediately before the gear change is made, and to rotate relative to each other after the gear change is made while the members for performing the connecting operation are necessary to be associated with the transmission of torque before the gear change is made. Further, the one-way engaging means may be interposed between two members connected to each other through the other member performing the same rotation before the gear change is made, in addition to a portion between two member directly connected to each other through the one-way engaging means. A position, in which the one-way engaging means is provided, differs between the case where there is provided clutch means (sixth clutch means K6) for selectively connecting the sun gear 1S of the first planetary gear set 1 and the carrier 3C of the third planetary gear set 3, and the case where there is not provided the clutch means, and also differs between the respective gear change patterns other than the gear to the adjacent gear and including a so-called skipping gear change. Hereinafter will be illustratively explained the position, in which the one-way engaging means is provided, respectively.

First will be explained the case where the sun gear 1S of the first planetary gear set 1 is normally connected to the carrier 3C of the third planetary gear set 3, and the clutch means is not provided between the sun gear 1S and the carrier 3C, as shown in FIGS. 1 through 6, and FIGS. 13 through 15.

Referring to the gear change between the first gear and the second gear, the one-way engaging means such as the one-way clutch is permitted to be interposed between the sun gear 2S of the second planetary gear set 2 and the sun gear 3S of the third planetary gear set 3. Referring to the gear change between the first gear and the 2.5th gear, the one-way engaging means is permitted to be provided at least in one position either between the carrier 3C of the third planetary gear set 3 and the casing 6 or between the sun gear 1S of the first planetary gear set 1 and the casing 6. Referring to the gear change between the first gear and the third gear, the one-way engaging means is permitted to be provided between the sun gear 2S of the second planetary gear set 2 and the sun gear 3S of the third planetary gear set 3. Referring to the gear change between the first gear and the 3.5th gear, the one-way engaging means is permitted to be interposed at least in one position either between the sun gear 2S of the second planetary gear set 2 and the sun gear 3S of the third planetary gear set 3, between the carrier 3C of the third planetary gear set 3 and the casing 6 or between the sun gear 1S of the first planetary gear set 1 and the casing 6. Further, in this case, there is the gear change pattern needing the performance of the gear change by simultaneously changing over at least three engaging means. Referring to the gear change between the first gear and the fourth gear, the one-way engaging means is permitted to be interposed at least in one position either between the carrier 3C of the third planetary gear 3 and the casing 6 or between the sun gear 1S of the first planetary gear set 1 and the casing 6. Referring to the gear change between the first gear and the fifth gear, the one-way engaging means is permitted to be interposed at least in one position either between the sun gear 2S of the second planetary gear set 2 and the sun gear 3S of the third planetary gear set 3, between the carrier 3C of the third planetary gear set 3 and the casing 6, between the sun gear 1S of the first planetary gear set 1 and the casing 6 or between the carrier 2C of the second planetary gear set 2 and the input shaft 4. Further, in this case, there is also the gear change pattern needing the gear change effected by simultaneously changing over at least three engaging means.

Referring to the gear change between the second gear and the 2.5th gear, the one-way engaging means is permitted to be interposed at least in one position either between the sun gear 2S of the second planetary gear set 2 and the sun gear 1S of the first planetary gear set 1 or between the sun gear 1S of the first planetary gear set 1 and the casing 6. Referring to the gear change between the second gear and the third gear, the one-way engaging means is permitted to be interposed at least in one position either between the sun gear 2S of the second planetary gear set 2 and the sun gear 1S of the first planetary gear set 1 or between the sun gear 2S of the second planetary gear set 2 and the casing 6. Referring to the gear change between the second gear and the 3.5th gear, the one-way engaging means is permitted to be interposed at least in one position either between the sun gear 2S of the second planetary gear set 2 and the sun gear 1S of the first planetary gear set 1, between the sun gear 2S of the second planetary gear set 2 and the casing 6 or between the sun gear 1S of the first planetary gear set 1 and the casing 6. In this case, there is the gear change pattern needing the gear change performed by changing over simultaneously at least three engaging means. Referring to the gear change between the second gear and the fourth gear, the one-way engaging means is permitted to be interposed at least in one position either between the sun gear 2S of the second planetary gear set 2 and the casing 6 or between the sun gear 1S of the first planetary gear set 1 and the casing 6. Referring to the gear change between the second gear and the fifth gear, the one-way engaging means is permitted to be interposed at least in one position either between the sun gear 2S of the second planetary gear set 2 and the casing 6, between the sun gear 1S of the first planetary gear set 1 and the casing 6 or between the carrier 2C of the second planetary gear set 2 and the input shaft 4. In this case, there is the gear change pattern needing the gear change performed by simultaneously changing over at least three engaging means.

Referring to the gear change between the 2.5th gear and the third gear, the one-way engaging means is permitted to be interposed at least in one position either between the sun gear 2S of the second planetary gear set 2 and the sun gear 3S of the third planetary gear set 3, between the sun gear 2S of the second planetary gear set 2 and the casing 6 or between the sun gear 3S of the third planetary gear set 3 and the casing 6. In this case, there is the gear change pattern needing the gear change performed by simultaneously changing over at least three engaging means. Referring to the gear change between the 2.5th gear and the 3.5th gear, the one-way engaging means is permitted to be interposed at least in one position either between the sun gear 2S of the second planetary gear set 2 and the sun gear 3S of the third planetary gear set 3 or the casing 6. Referring to the gear change between the 2.5th gear and the fourth gear, the one-way engaging means is permitted to be interposed at least in a position either between the sun gear 2S of the second planetary gear set 2 and the casing 6, between the sun gear 3S of the third planetary gear set 3 and the casing 6. Referring to the gear change between the 2.5th gear and the fifth gear, the one-way engaging means is permitted to be interposed at least in one position either between the sun gear 2S of the second planetary gear set 2 and the sun gear 3S of the third planetary gear set 3 or the casing 6 or between the carrier 2C of the second planetary gear set 2 and the input shaft 4. In this case, there is the gear change pattern needing the gear change performed by simultaneously changing over at least three engaging means.

Referring to the gear change between the third gear and the 3.5th gear and the gear change between the third gear and the fourth gear respectively, the one-way engaging means is permitted to be interposed between the sun gear 1S of the first planetary gear set 1 and the casing 6. Referring to the gear change between the third gear and the fifth gear, the one-way engaging means is permitted to be interposed at least in one position either between the sun gear 2S of the second planetary gear set 2 and the ring gear 2R or the carrier 2C of the second planetary gear set 2 or the ring gear 1R of the first planetary gear set 1, between the input shaft 4 and the ring gear 2R or the carrier 2C of the second planetary gear set 2 or the ring gear 1R of the first planetary gear set 1 or between the sun gear 1S of the first planetary gear set 1 and the casing 6. In this case, there is also the gear change pattern needing the gear change performed by simultaneously changing over at least three engaging means.

Referring to the gear change between the 3.5th gear and the fourth gear, the one-way engaging means is permitted to be interposed between the sun gear 3S of the third planetary gear set 3 and the casing 6. Referring to the gear change between the 3.5th gear and the fifth gear, one-way engaging means is permitted to be interposed at least in one position either between the sun gear 2S of the second planetary gear set 2 and the ring gear 2R or carrier 2C of the second planetary gear set 2 or the ring gear 1R of the first planetary gear set 1 or between the input shaft 4 and the ring gear 2R or carrier 2C of the second planetary gear set 2 or the ring gear 1R of the first planetary gear set 1.

Referring to the gear change between the fourth gear and the fifth gear, since the whole gear train rotates as a single unit in the fourth gear, the one-way engaging means is provided for each of three components of the respective planetary gear sets 1, 2 3. That is, the one-way engaging means is permitted to be interposed between the sun gear 2S of the second planetary gear set 2 and either one of the ring gear 2R and carrier 2C of the second planetary gear set 2, or the sun gear 3S and ring gear 3R of the third planetary gear set 3 or the carrier 1C and ring gear 1R of the first planetary gear set 1. Referring to the ring gear 2R of the second planetary gear set 2, the one-way engaging means is permitted to be interposed between the ring gear 2R and any other member (including the input shaft 4) except the casing 6 and the ring gear 1R of the first planetary gear set 1. Referring to the carrier 2C of the second planetary gear set 2 and the sun gear 3S of the third planetary gear set 3 respectively, the one-way engaging means is permitted to be interposed between the carrier 2C and the sun gear 3S and any other member (including the input shaft 4) except the casing 6. Referring to the carrier 3C of the third planetary gear set 3, the one-way engaging means is permitted to be interposed either between the ring gear 2R and carrier 2C of the second planetary gear set 2, between the sun gear 3S and ring gear 3R of the third planetary gear set 3, or between the carrier 1C and ring gear 1R of the first planetary gear set 1. Referring to the ring gear 3R of the third planetary gear set 3, the one-way engaging means is permitted to be interposed between the ring gear 3R and any other member (including the input shaft 4) except the case 6 and the carrier 1R of the first planetary gear set 1. Referring to the sun gear 1S of the first planetary gear set 1, the one-way engaging means is permitted to be interposed either between the ring gear 2R and carrier 2C of the second planetary gear set 2, between the sun gear 3S and ring gear 3R of the third planetary gear set 3, or between the carrier 1C and ring gear 1R of the first planetary gear set 1. Referring to the carrier 1C of the first planetary gear set 1, the one-way engaging means is permitted to be interposed between the carrier 1C and any other member (including the input shaft 4) except the casing 6 and the ring gear 3R of the third planetary gear set 3. Then, referring to the ring gear 1R of the first planetary gear set 1, the one-way engaging means is permitted to be interposed between the ring gear 1R and any other member (including the input shaft 4) except the casing 6 and the ring gear 2R of the second planetary gear set 2.

Next will be explained the case where the clutch means is provided for selectively connecting the sun gear 1S of the first planetary gear set 1 to the carrier 3C of the third planetary gear set 3 as shown in FIGS. 7 through 12 and FIG. 14. Further, in the constitution provided with such clutch means, the carrier 3C of the third planetary gear set 3 is permitted to be selectively connected to and disconnected from the sun gear 1S of the first planetary gear set 1 and accordingly the carrier 3C of the third planetary gear set 3 is singly held stationary. Also, since the connecting relationship among the sun gears 1S, 2S and 3S themselves of the respective planetary gear sets 1, 2 and 3 is properly changed, compared with the case that the sixth clutch means K6 is not provided, there are differences mainly in whether or not the one-way engaging means is permitted to be disposed between the carrier 3C of the third planetary gear set 3 and the sun gear 1S of the first planetary gear set 1 and between the carrier 3C of the third planetary gear set 3 and the casing 6 and whether or not the one-way engaging means is permitted to be interposed between the respective sun gears 1S, 2S, 3S. Accordingly, hereinafter will be described only the disposal position of one-way engaging means different in the gear change patterns, and the description of the positions same as the pattern as noted above is omitted.

That is, the one-way engaging means is permitted to be interposed either in one position between the carrier 3C of the third planetary gear set 3 and the sun gear 1S of the first planetary gear set 1 or between the carrier 3C of the third planetary gear set 3 and the casing 6 besides in the positions noted above with reference to the respective gear changes between the first gear and second gear and between the first gear and the third gear. Also, referring to the gear change between the first gear and the fourth gear and the gear change between the first gear and the fifth gear, the one-way engaging means is permitted to be interposed between the carrier 3C of the third planetary gear set 3 and the sun gear 1S of the first planetary gear set 1 besides in the positions as noted above.

Referring to the gear change between the second speed and the fifth gear out of the speed change between the second gear and other gear, the one-way engaging means is permitted to be interposed between the sun gear 2S of the second planetary gear set 2 and the sun gear 1S of the first planetary gear set 1.

Referring to the gear change between the 2.5th gear and the fourth gear out of the gear change between the 2.5th gear and the other gear, the one-way engaging means is permitted to be interposed between the sun gear 2S of the second planetary gear set 2 and the sun gear 3S of the third planetary gear set 3.

Further, referring to the gear change between the fourth gear and the fifth gear, the one-way engaging means is permitted to be interposed, besides in the positions as noted above, either between the sun gear 2S of the second planetary gear set 2 and the sun gear 1S of the first planetary gear set 1, between the carrier 3C of the third planetary gear set 3 and the carrier 1S of the first planetary gear set 1, or between the sun gear 1S of the first planetary gear set 1 and the input shaft 4.

As mentioned above, while the one-way engaging means is set in various positions, if necessary, in order to perform the smooth gear change, referring to the gear change between the adjacent speeds themselves in the first gear to the fifth gear of basic, the one-way engaging means, when utilized, is permitted to be set for example either between the sun gear 2S of the second planetary gear set 2 and the sun gear 3S of the third planetary gear set 3, between the sun gear 2S of the second planetary gear set 2 and the sun gear 1S of the first planetary gear set 1, between the sun gear 2S of the second planetary gear set 2 and the casing 6, between the sun gear 1S of the first planetary gear set 1 and the casing 6, between the sun gear 2S of the second planetary gear set 2 and the sun gear 3S of the third planetary gear set 3 or between the carrier 2C of the second planetary gear set 2 and the input shaft 4. This applies similarly to both cases of providing the sixth clutch means K6 and not providing the same.

Further, referring to how to use the one-way engaging means, the specifications and drawings attached to the applications of Japanese Patent Application Nos. 63—176270 and 63—221670 which have been already applied by the present assignee are utilized. An improvement of the engaging means will be shown as follows.

Figure 16:
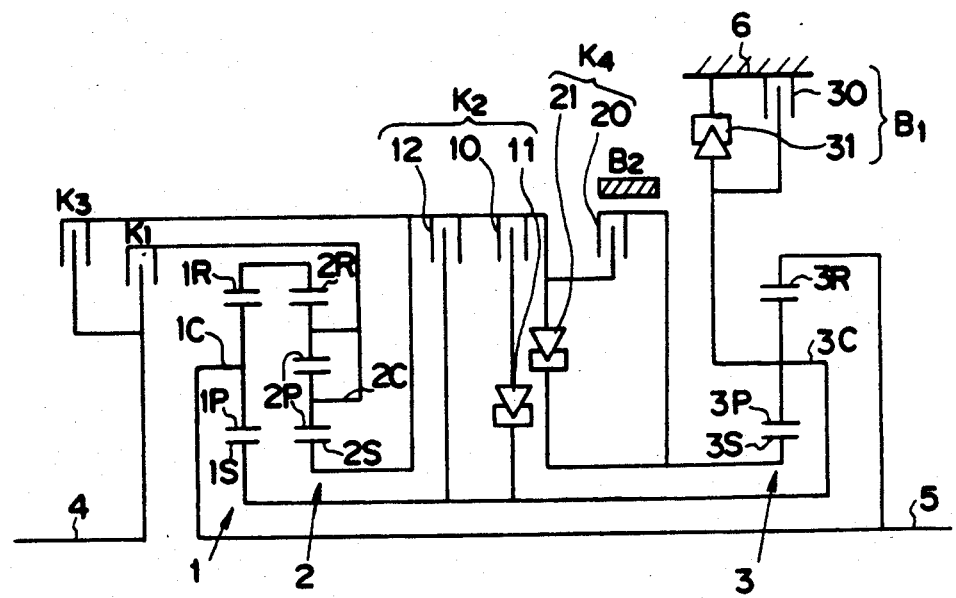

The embodiment shown in FIG. 16 is similar to that in FIG. 1, except that the second clutch means K2 is constituted by arranging in series relationship the multi-disc clutch 10 and the one-way clutch 11, while disposing in parallel relationship the other multi disc clutchs 12 relative to these combinations, the fourth clutch means K4 is constituted of a multi-disc disk clutch 20 and a one-way clutch 21 disposed in parallel relationship to each other, and the first brake means B1 is constituted of a multi-disc brake 30 and a one-way clutch 31 disposed in parallel relationship to each other. Further, the second brake means B2 is constituted of a band brake. Table 13 shows the operation of the automatic transmission in accordance with the embodiment shown in FIG. 16. On the table, the mark ○ represents the engaged condition, and the mark X represents the released condition, similarly to the aforementioned tables. In addition, in the following table, the mark ⊙ represents the engaged condition in engine braking. Further, a, b, c ... in the columns showing the gear represent the combination of other engaged and released conditions to set the corresponding gear. In the performance of the gear change, the combination of the engaged and released conditions may be changed in the order of the symbols or any combination of the engaged and released conditions may be selected.

TABLE 13

| | clutch means | | | | | | brake means | | |
|---|---|---|---|---|---|---|---|---|---|
| | | K2 | | | | K4 | | B1 | |
| | K1 | 12 | 10 | 11 | K3 | 20 | 21 | 30 | 31 | B2 |
| 1st | O | X | X | X | X | ⊙ | O | ⊙ | O | X |
| 2nd | O | ⊙ | O | O | X | X | X | ⊙ | O | X |
| 3rd | O | X | O | X | O | X | X | ⊙ | O | X |
| 4th a | O | O | O | X | O | X | X | X | X | X |
| b | ⊙ | ⊙ | ⊙ | X | O | ⊙ | O | X | X | X |
| 5th | X | O | O | X | O | X | X | X | X | O |
| Rev | X | X | X | X | O | O | X | O | X | X |
| 2.5th | O | X | O | X | X | ⊙ | O | X | X | O |
| 3.5th | O | X | O | X | O | X | X | X | X | O |

Figure 17:
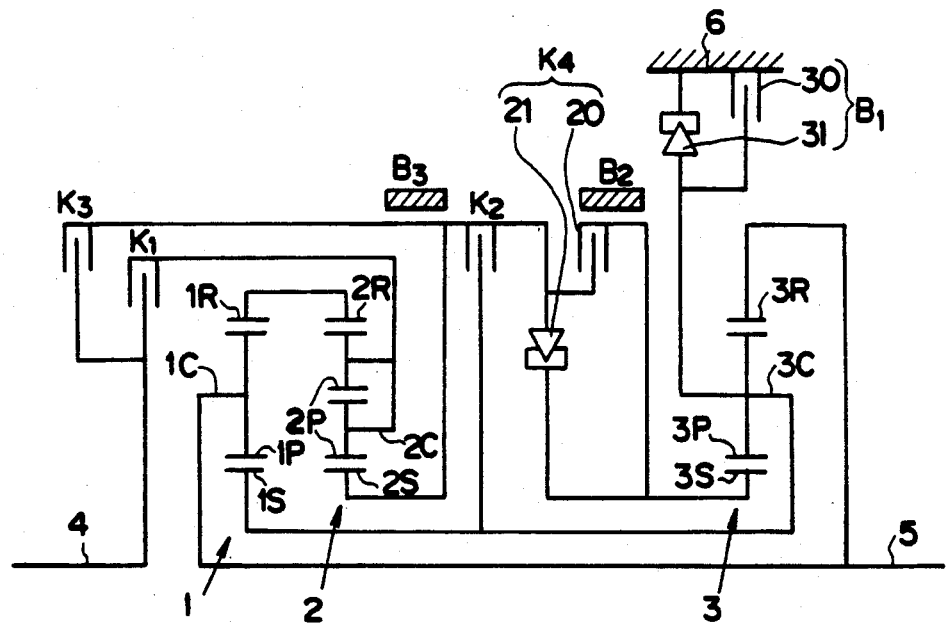

The embodiment shown in FIG. 17 is similar to that shown in FIG. 16, except that the second clutch means K2 is constituted of a single multi-disc clutch, and the third brake means B3 consisting of a band brake for selectively holding the sun gear 2S of the second planetary gear set 2 stationary. Table 14 shows the operation of the embodiment of FIG. 17.

TABLE 14

| | clutch means | | | | | brake means | | |
|---|---|---|---|---|---|---|---|---|
| | | | | K4 | | B1 | | |
| | K1 | K2 | K3 | 20 | 21 | 30 | 31 | B2 | B3 |
| 1st | O | X | X | ⊙ | O | ⊙ | O | X | X |
| 2nd | O | X | X | X | X | ⊙ | O | X | O |
| 3rd | O | X | O | X | X | ⊙ | O | X | X |
| 4th a | O | O | O | X | X | X | X | X | X |
| b | X | O | O | ⊙ | O | X | X | X | X |
| 5th | X | O | O | X | X | X | X | O | X |
| Rev | X | X | O | O | X | O | X | X | X |
| 2.5th | O | X | X | ⊙ | O | X | X | O | X |
| 3.5th | O | X | O | X | X | X | X | O | X |

Figure 18:
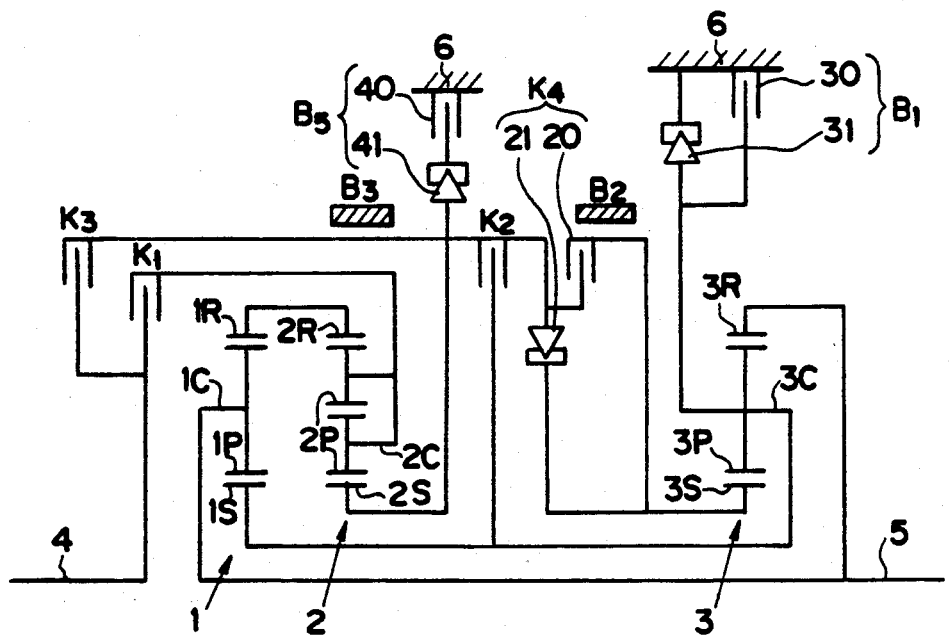

The embodiment shown in FIG. 18 is similar to that of FIG. 17, except that the fifth brake means B5 having a multi-disc brake 40 and a one-way clutch 41, which are disposed in series relationship, is disposed in parallel relationship to the third brake means B3 constituted of a band brake. Table 15 shows the operation of the embodiment of FIG. 18.

TABLE 15

| | clutch means | | | | | brake means | | | | |
|---|---|---|---|---|---|---|---|---|---|---|
| | | | | K4 | | B1 | | | | B5 |
| | K1 | K2 | K3 | 20 | 21 | 30 | 31 | B2 | B3 | 40 | 41 |
| 1st | O | X | X | ⊙ | O | ⊙ | O | X | X | X | X |
| 2nd | O | X | X | X | X | ⊙ | O | X | ⊙ | O | O |
| 3rd | O | X | O | X | X | ⊙ | O | X | X | O | X |
| 4th a | O | X | O | O | X | X | X | X | X | O | X |
| b | X | O | O | ⊙ | O | X | X | X | X | O | X |
| 5th | X | O | O | X | X | X | X | O | X | O | X |
| Rev | X | X | O | O | X | O | X | X | X | X | X |
| 2.5th | O | X | X | ⊙ | O | X | X | O | X | O | X |
| 3.5th | O | X | O | X | X | X | X | O | X | O | X |

Figure 19:
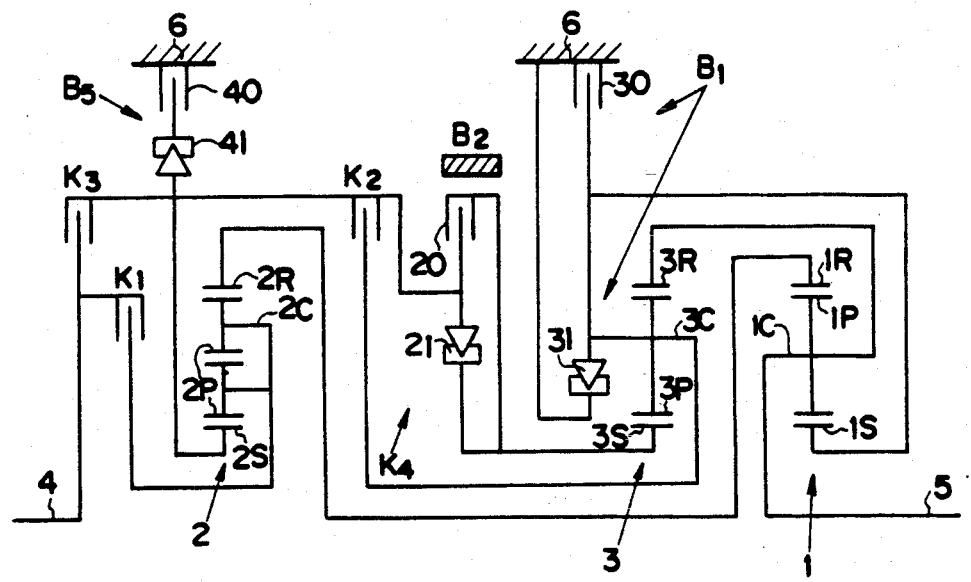

The embodiment shown in FIG. 19, similarly to the embodiment shown in FIG. 4, is so constituted that the second planetary gear set 2, the third planetary gear set 3 and the first planetary gear set 1 are arranged in the mentioned order from the side of the input shaft 4, and the fourth clutch means K4 is constituted of the multi-disc clutch 20 and the one-way clutch 21 disposed on the inner peripheral side of the multi-disc clutch 20 so as to be in parallel relationship to the clutch 20. Also, the first brake means B1 is constituted of the multi-disc brake 30 and the one-way clutch 31 disposed on the inner peripheral of side of the brake 30 so as to be in parallel relationship to the brake 30. Further, the second brake means B2 is constituted of the band brake, an the fifth brake means B5 for selectively holding the sun gear 2S of the second planetary gear set 2 stationary is constituted of the multi-disc brake 40 and the one-way clutch 41 arranged in series relationship to each other. The other constitution is similar to that shown in FIG. 4. Table 16 shows the operation of the embodiment of FIG. 19.

TABLE 16

| | clutch means | | | | | brake means | | | | |
|---|---|---|---|---|---|---|---|---|---|---|
| | | | | K4 | | B1 | | | B5 | |
| | K1 | K2 | K3 | 20 | 21 | 30 | 31 | B2 | 40 | 41 |
| 1st | O | X | X | ⊙ | O | ⊙ | O | X | X | X |
| 2nd | O | ⊙ | X | X | X | ⊙ | O | X | O | O |
| 3rd | O | X | X | X | X | ⊙ | O | X | O | X |
| 4th a | O | X | O | O | X | X | X | X | O | X |
| b | O | O | O | O | X | X | X | X | O | X |
| c | ⊙ | O | O | ⊙ | O | X | X | X | O | X |
| 5th | X | O | O | X | X | X | X | O | O | X |
| Rev | X | X | O | O | X | O | X | X | X | X |
| 2.5th | O | X | X | ⊙ | X | X | X | O | O | O |
| 3.5th | O | X | O | X | X | X | X | O | O | X |

Figure 20:
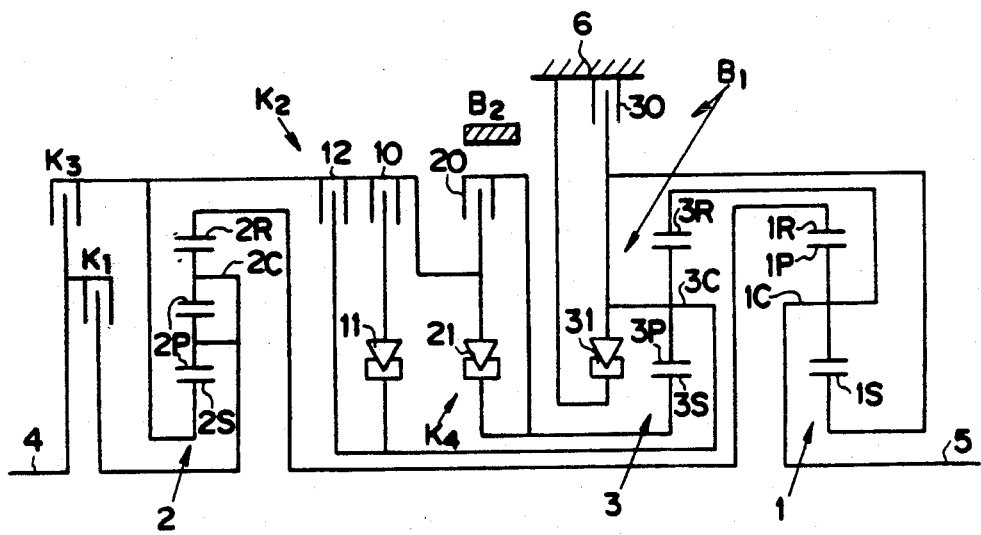

The embodiment shown in FIG. 20 is similar to that shown in FIG. 19, except that the fifth brake means B5 is removed, and the second clutch means K2 is constituted of the multi-disc clutch 10, the one-way clutch 11 disposed in series relationship to each other, and another multi-disc clutch 12 in parallel relationship to the combination of the clutches 10, 11. In other words, the embodiment shown in FIG. 20 is a modification of the embodiment shown in FIG. 16 with respect to the arrangement, so that the table showing the operation thereof is the same as Table 13.

Figure 21:
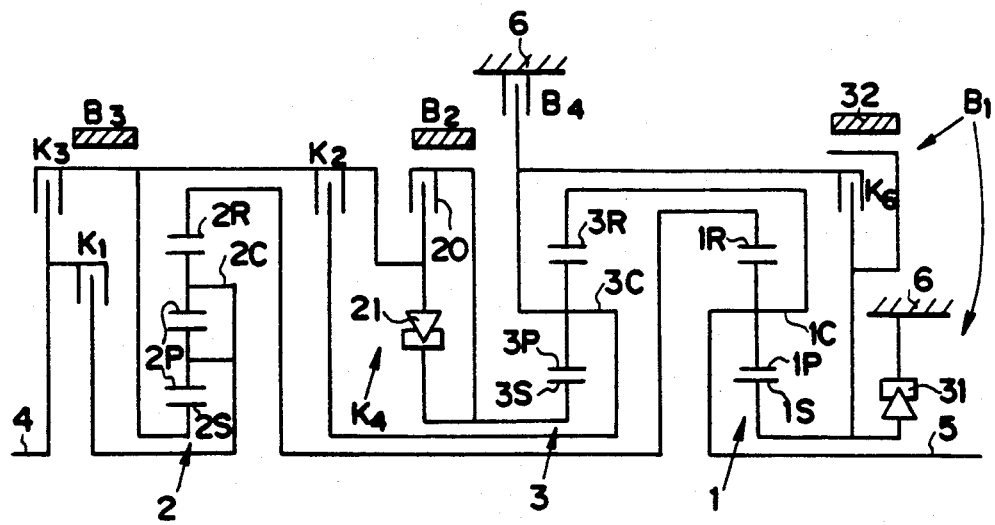

The embodiment shown in FIG. 21 is similar to that shown in FIG. 17, except that the fifth brake means B5 is replaced by the third brake means B3 constituted of a band brake, the sixth clutch means K6 is provided between the carrier 3C of the third planetary gear set 3 and the sun gear 1S of the first planetary gear set 1, thus the fourth brake means B4 is interposed between the carrier 3C of the third planetary gear set 3 and the casing 6, further the first brake means B1 consisting of the band brake 32 and the one-way clutch 3 disposed in parallel relation to each other is disposed at the opposite side to the third planetary gear set 3 relative to the first planetary gear set 1. Table 17 shows the operation of the embodiment of FIG. 21.

TABLE 17

| | clutch means | | | | | | brake means | | | |
|---|---|---|---|---|---|---|---|---|---|---|
| | | | | K4 | | | B1 | | | |
| | K1 | K2 | K3 | 20 | 21 | K6 | 32 | 31 | B2 | B3 | B4 |
| 1st | O | X | X | ⊙ | O | ⊙ | ⊙ | O | X | X | O |
| 2nd a | O | X | X | X | X | X | ⊙ | O | X | O | O |
| b | O | X | X | O | X | X | ⊙ | O | O | O | X |
| c | O | X | X | ⊙ | O | X | ⊙ | O | O | X | X |
| 3rd a | O | X | O | X | X | X | ⊙ | O | O | X | X |
| b | O | X | O | O | X | X | ⊙ | O | X | X | X |
| 4th a | O | X | O | O | X | O | X | X | X | X | X |
| b | O | O | O | O | X | O | X | X | X | X | X |
| c | X | O | O | ⊙ | O | O | X | X | X | X | X |
| 5th | X | O | O | X | X | O | X | X | O | X | X |
| Rev | X | X | O | O | X | X | O | X | X | X | O |
| 2.5th | O | X | X | ⊙ | O | O | X | X | O | X | X |
| 3.5th | O | X | O | X | X | O | X | X | O | X | X |

Figure 22:
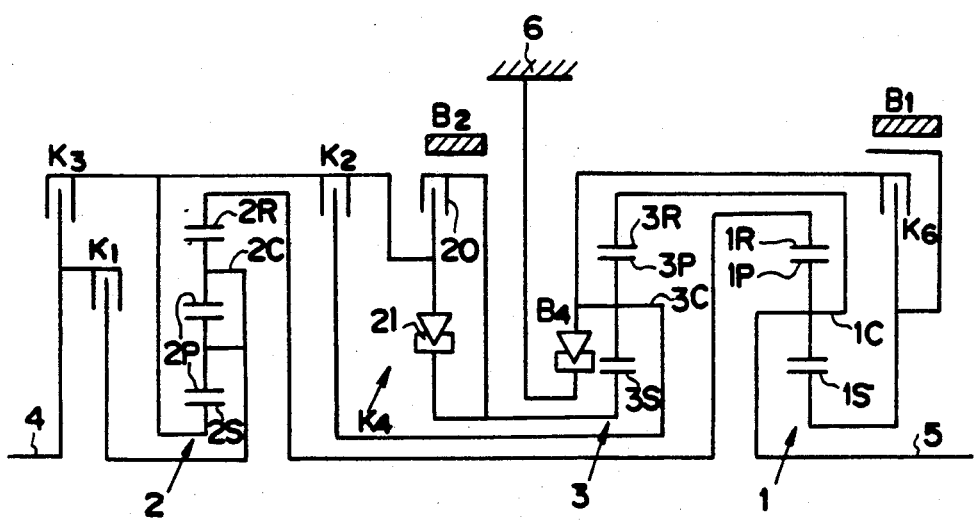

The embodiment shown in FIG. 22 is similar to that shown in FIG. 21, except that the third brake means B3 is removed, the one-way clutch having the fourth brake means B4 disposed between the inner peripheral side of the carrier 3C of the third planetary gear set 3 and a portion substantially integral with the casing 6, and the first brake means B1 is constituted as a single band brake. FIG. 18 shows the operation of the embodiment of FIG. 22.

TABLE 18

| | clutch means | | | | | | brake means | | |
|---|---|---|---|---|---|---|---|---|---|
| | | | | K4 | | | | | |
| | K1 | K2 | K3 | 20 | 21 | K6 | B1 | B2 | B4 |
| 1st | O | X | X | ⊙ | O | ⊙ | O | X | O |
| 2nd | O | X | X | ⊙ | O | X | O | O | X |
| 3rd a | O | X | O | X | X | X | O | O | X |
| b | O | X | O | O | X | O | O | X | X |
| c | O | X | O | X | X | O | ⊙ | X | O |
| 4th a | O | X | O | O | X | O | X | X | X |
| b | O | O | O | O | X | O | X | X | X |
| c | X | O | O | ⊙ | O | O | X | X | X |
| 5th | X | O | O | X | X | O | X | O | X |
| Rev | X | X | O | O | X | O | O | X | X |
| 2.5th | O | X | X | ⊙ | O | O | X | O | X |
| 3.5th | O | X | O | X | X | O | X | O | X |

Figure 23:
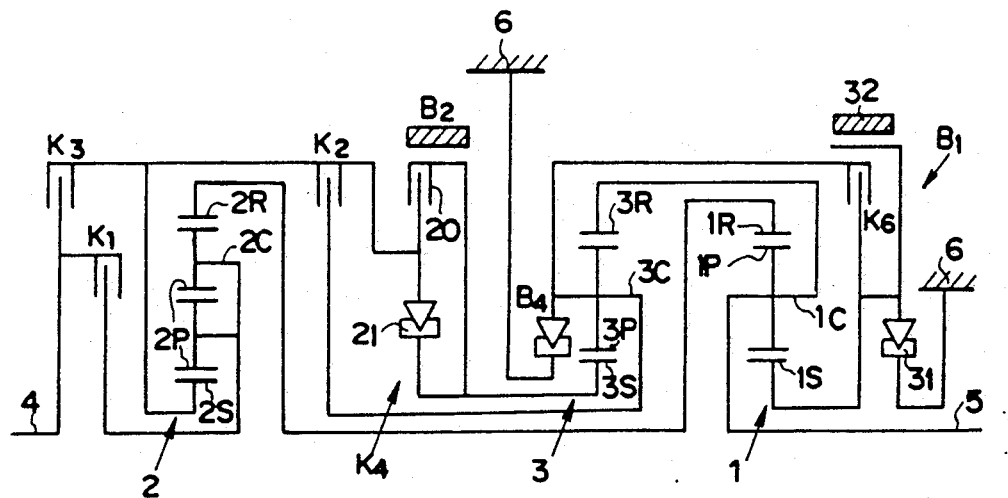

The embodiment shown in FIG. 23 is similar to that shown in FIG. 22, except that the first brake means B1 is modified into the constitution formed of the one-way clutch 31 and the band brake 32 disposed in parallel relationship to each other as described with reference to FIG. 21. Table 19 shows the operation of the embodiment of FIG. 23.

TABLE 19

| | clutch means | | | | | | brake means | | | |
|---|---|---|---|---|---|---|---|---|---|---|
| | | | | K4 | | | B1 | | | |
| | K1 | K2 | K3 | 20 | 21 | K6 | 32 | 31 | B2 | B4 |
| 1st | O | X | X | ⊙ | O | ⊙ | ⊙ | O | X | O |
| 2nd | O | X | X | ⊙ | O | X | ⊙ | O | O | X |
| 3rd a | O | X | O | X | X | X | ⊙ | O | O | X |
| b | O | X | O | O | X | X | ⊙ | O | X | X |
| 4th a | O | X | O | O | X | O | X | X | X | X |
| b | O | O | O | O | X | O | X | X | X | X |
| c | X | O | O | ⊙ | O | O | X | X | X | X |
| 5th | X | O | O | X | X | O | X | X | O | X |
| Rev | X | X | O | O | X | O | O | X | X | X |
| 2.5th | O | X | X | ⊙ | O | O | X | X | O | X |

TABLE 19-continued

| | clutch means | | | | | | brake means | | | |
|---|---|---|---|---|---|---|---|---|---|---|
| | | | | K4 | | | B1 | | | |
| | K1 | K2 | K3 | 20 | 21 | K6 | 32 | 31 | B2 | B4 |
| 3.5th | O | X | O | X | X | O | X | X | O | X |

Figure 24:
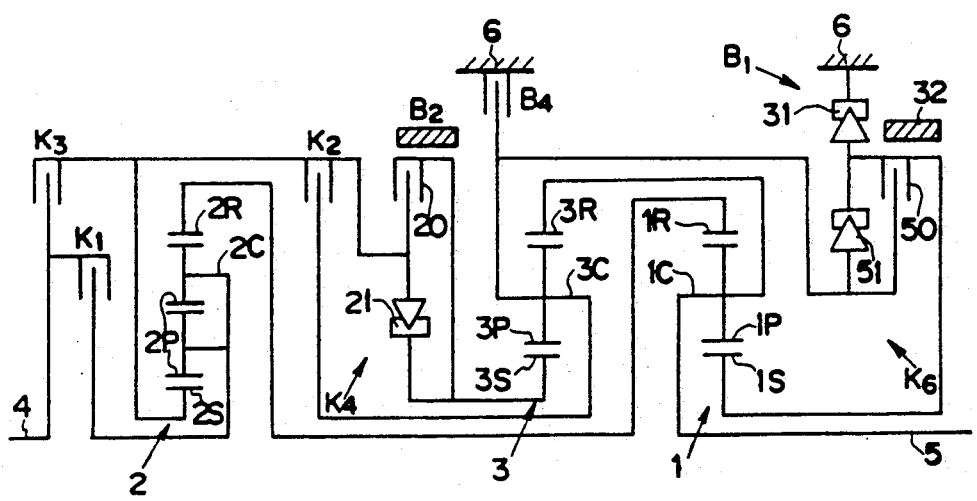

The embodiment shown in FIG. 24 is similar to that shown in FIG. 21, except that the one-way clutch 31 constituting a portion of the first brake means B1 is located on the outer peripheral side of the sixth clutch means K6, and the sixth clutch means K6 is constituted of a multi-disc clutch 50 and a one-way clutch 51 disposed in parallel relationship to each other. Table 20 shows the operation of the embodiment of FIG. 24.

TABLE 20

| | clutch means | | | | | | | brake means | | | |
|---|---|---|---|---|---|---|---|---|---|---|---|
| | | | | K4 | | K6 | | B1 | | | |
| | K1 | K2 | K3 | 20 | 21 | 50 | 51 | 32 | 31 | B2 | B4 |
| 1st a | O | X | X | ⊙ | O | O | X | ⊙ | O | X | O |
| b | O | X | X | ⊙ | O | ⊙ | O | ⊙ | O | X | X |
| 2nd | O | X | X | ⊙ | O | X | O | ⊙ | O | O | X |
| 3rd a | O | X | O | X | X | X | O | ⊙ | O | O | X |
| b | O | X | O | O | X | X | O | ⊙ | O | X | X |
| 4th a | O | X | O | O | X | O | X | X | X | X | X |
| b | O | O | O | O | X | O | X | X | X | X | X |
| c | X | O | O | ⊙ | O | O | X | X | X | X | X |
| 5th | X | O | O | X | X | O | X | X | X | O | X |
| Rev | X | X | O | O | X | X | O | O | X | X | O |
| 2.5th | O | X | X | ⊙ | O | O | X | X | X | O | X |
| 3.5th | O | X | O | X | X | O | X | X | X | O | X |

Though the first to twenty-fourth embodiments of the present invention have been heretofore described, it is a matter of course that the present invention is not limited to these embodiments. The connection of the components themselves in the respective planetary gear set will do either in the normal connection or in the selective connection through engaging means such as a clutch. Further, the members for interconnecting the input and output shafts and those to be held stationary are permitted to the properly determined, if necessary. Also, in the present invention, the one-way engaging means such as one-way clutch may be employed for either the clutch means or brake means or a plurality of clutch means or brake means.

Referring the advantages obtained in accordance with the present invention together, it is possible to set five forward speeds to seven forward speeds by the use of a small number of engaging means according to the present invention. Also, when the five forward speeds are set, the change gear ratios of the respective speeds are approximately relevant to the geometric series and further the respective planetary gear sets are prevented from having the large diameters. As a result, according to the present invention, it is possible to obtain a compact automatic transmission which is excellent in power performance and gear change controllability, and permits the reduction of shocks in gear change.

What is claimed is:

1. An automatic transmission for changing the rotational speed of an input shaft to transmit the resultant rotation to an output shaft through a gear train including a plurality of planetary gear sets, comprising:
    a single pinion type first planetary gear set provided with a first sun gear, a first ring gear, and a first carrier for holding a pinion gear meshing with said first sun gear and said first ring gear;

a double pinion type second planetary gear set provided with a second sun gear, a second ring gear normally or selectively connected to said first ring gear, and a second carrier for holding a pinion gear meshing with said second sun gear and the other pinion gear meshing with said pinion gear and said second ring gear; and a single pinion type third planetary gear system provided with a third sun gear normally or selectively connected to said second sun gear, a third ring gear normally or selectively connected to said first carrier, and a third carrier for holding a pinion gear meshing with said third sun gear and said third ring gear and normally or selectively connected to at least one of said first sun gear and said second sun gear.

2. An automatic transmission according to claim 1, wherein it further comprises first clutch means for selectively interconnecting the input shaft and the second carrier, second clutch means for selectively interconnecting the second sun gear and the third carrier, third clutch means for selectively interconnecting the input shaft and the second sun gear, fourth clutch means for selectively interconnecting the second sun gear and the third sun gear, first brake means for selectively stopping the rotation of the first sun gear, and second brake means for selectively stopping the rotation of the third sun gear, the output shaft being connected to the first carrier and capable of setting five forward speeds and one reverse.

3. An automatic transmission according to claim 2, wherein it further comprises fifth clutch means for selectively interconnecting the input shaft and the third sun gear.

4. An automatic transmission according to claim 2, wherein it further comprises sixth clutch means for selectively interconnecting the first sun gear and the third carrier.

5. An automatic transmission according to claim 4, wherein said sixth clutch means has a single multi-disc clutch.

6. An automatic transmission according to claim 4, wherein said sixth clutch means has a one-way clutch and a multi-disc clutch disposed in parallel relationship to each other between the third carrier and the first sun gear.

7. An automatic transmission according to claim 4, wherein it further comprises fourth brake means for selectively stopping the rotation of the third carrier.

8. An automatic transmission according to claim 7 further comprising a third brake means for selectively stopping the rotation of the second sun gear.

9. An automatic transmission according to claim 7, wherein a plurality of types of combination patterns of the clutch means and the brake means to be engaged are provided to set at least any one of gears.

10. An automatic transmission according to claim 7, wherein said first fourth brake means has a single multiple disc brake.

11. An automatic transmission according to claim 7, wherein it further comprises a casing for accommodating said gear train, and said fourth brake means has a one-way clutch disposed between the third carrier and the casing.

12. An automatic transmission according to claim 7 further comprising a casing for accommodating the gear train,
wherein the fourth clutch means has a one-way clutch and a multi-disc clutch disposed in parallel relationship to each other between the second sun gear and the third sun gear, the first brake means has a one-way clutch and a multi-disc brake disposed in parallel relationship to each other between the third sun gear and the casing and the second brake means consists of a band brake.

13. An automatic transmission according to claim 7, wherein the fourth clutch means has a one-way clutch and a multi-disc clutch disposed in parallel relationship to each other between the second sun gear and the third sun gear, and each of the first and second brake means consists of a band brake.

14. An automatic transmission according to claim 2, wherein it further comprises seventh clutch means for selectively interconnecting the first carrier and the third ring gear.

15. An automatic transmission according to claim 2, wherein it further comprises eighth clutch means for selectively interconnecting the first ring gear and the second ring gear.

16. An automatic transmission according to claim 2, wherein it further comprises third brake means for selectively stopping the rotation of the second sun gear.

17. An automatic transmission according to claim 16, wherein said third brake means has a band brake.

18. An automatic transmission according to claim 16, wherein it further comprises a casing for accommodating said gear train, and said third brake means has a one-way clutch and a multi-disc brake disposed in series relationship to each other between the second sun gear and the casing.

19. An automatic transmission according to claim 16, wherein said third brake means has a single multi-disc brake.

20. An automatic transmission according to claim 16 further comprising a sixth clutch means for selectively interconnecting the first sun gear and the third carrier.

21. An automatic transmission according to claim 20 further comprising a casing for accommodating the gear train,
wherein the fourth clutch means has a one-way clutch and multi-disc clutch disposed in parallel relationship to each other between the second sun gear and the third sun gear, the first brake means has a one-way clutch and a multi-disc brake disposed in parallel relationship to each other between the third sun gear and the casing, the second brake means consists of a band brake and the third brake means has a one-way clutch and a multi-disc brake disposed in series relationship between the second sun gear and the casing.

22. An automatic transmission according to claim 20 further comprising a casing for accommodating the gear train,
wherein the fourth clutch means has a one-way clutch and a multi-disc clutch disposed in parallel relationship to each other between the second sun gear and the third sun gear, the first brake means has a one-way clutch and a multi-disc brake disposed in parallel relationship to each other between the third sun gear and the casing and each of the second and third brake means consists of a band brake.

23. An automatic transmission according to claim 20 further comprising a casing for accommodating the gear train, wherein the fourth clutch means has a one-way clutch and a multi-disc clutch disposed in parallel relationship to each other between the second sun gear and the third sun gear, each of the first brake means and the second brake means consists of a band brake and the third brake means has a one-way clutch and a multi-disc brake disposed in series relationship between the second sun gear and the casing.

24. An automatic transmission according to claim 20, wherein the fourth clutch means has a one-way clutch and a multi-disc clutch disposed in parallel relationship to each other between the second sun gear and the third sun gear and each of the first, second and third brake means consists of a band brake.

25. An automatic transmission according to claim 2, wherein the input shaft and the output shaft are disposed on the identical axis, and the first, second and third planetary gear sets are arranged between said input shaft and said output shaft in the mentioned order from the side of the input shaft and on the identical axis.

26. An automatic transmission according to claim 25, wherein the first and third clutch means are disposed on the input shaft side from said first planetary gear set, and the second and fourth clutch means are disposed between said second and third planetary gear sets.

27. An automatic transmission according to claim 2, wherein the second, first and third planetary gear sets are arranged in the mentioned order on the extension of the input shaft axis.

28. An automatic transmission according to claim 27, wherein said first and third clutch means are disposed on the input shaft side from said second planetary gear set, and said second and fourth clutch means and the first and second brake means are disposed on the opposite side to said first planetary gear set through said third planetary gear set.

29. An automatic transmission according to claim 27, wherein said first and third clutch means are disposed on the input shaft side from said second planetary gear set, and said second and fourth clutch means are disposed between said first and third planetary gear sets.

30. An automatic transmission according to claim 2, wherein the input shaft and the output shaft are disposed on the identical axis, and the second, third and first planetary gear sets are arranged between said input shaft and said output shaft from the side of the input shaft and on the identical axis.

31. An automatic transmission according to claim 30, wherein the first and third clutch means are disposed on the input shaft side from said second planetary gear set, and the second and third clutch means are disposed between said second and third planetary gear sets.

32. An automatic transmission according to claim 2, wherein a plurality of types of combination patterns of the clutch means and the brake means to be engaged are provided to set at least any one of gears.

33. An automatic transmission according to claim 2, wherein each of said clutch means has a multi-disc clutch.

34. An automatic transmission according to claim 2, wherein said second clutch means has a one-way clutch and a multi-disc clutch arranged in series relationship to each other between the second sun gear and the third carrier, and another multi-disc clutch arranged in parallel relationship to said one-way clutch and said multi-disc clutch.

35. An automatic transmission according to claim 2, wherein said fourth clutch means has a one-way clutch and a multi disc clutch disposed in parallel relationship to each others between the second sun gear and the third sun gear.

36. An automatic transmission according to claim 2, wherein each of said brake means has a multi-disc brake.

37. An automatic transmission according to claim 2, wherein said first brake means has a band brake.

38. An automatic transmission according to claim 2, wherein it further comprises a casing for accommodating said gear train, and said first brake means has a one-way clutch and a multi-disc brake disposed in parallel relationship to each other between the casing and the third carrier normally connected to the first sun gear.

39. An automatic transmission according to claim 2, wherein it further comprises a casing for accommodating said gear train, and said first brake means has a one-way clutch disposed between the first sun gear and the casing and a band brake disposed in parallel relationship to said one-way clutch.

40. An automatic transmission according to claim 2, wherein said second brake means has a band brake.

41. An automatic transmission according to claim 2 further comprising a casing for accommodating the gear train,
wherein the fourth clutch means has a one-way clutch and multi-clutch disposed in parallel relationship to each other between the second sun gear and the third sun gear, the first brake means has a one-way clutch and a multi-disc brake disposed in parallel relationship to each other between the third sun gear and the casing and the second brake means consists of a band brake.

42. An automatic transmission according to claim 41, wherein the second clutch means has a one-way clutch and a multi-disc clutch disposed in series relationship to each other between the second sun gear and the third carrier and another multi-disc clutch disposed in parallel relationship to the arrangement of the one-way clutch and the multi-disc clutch.

43. An automatic transmission according to claim 41 further comprising a third brake means for selectively stopping the rotation of the second sun gear, the third brake means including a one-way clutch and a multi-disc brake disposed in series relationship between the second sun gear and the casing.

44. An automatic transmission according to claim 41 further comprising a third brake means for selectively stopping the rotation of the second sun gear, which consists of a band brake.

* * * * *

UNITED STATES PATENT AND TRADEMARK OFFICE
CERTIFICATE OF CORRECTION

PATENT NO.   : 5,030,186
DATED        : July 9, 1991
INVENTOR(S)  : ASADA, Toshiyuki It is certified that error appears in the above-identified patent and that said Letters Patent is hereby corrected as shown below:

```
Col. 25, Claim 10, line 2, after "said" delete "first".
Col. 26, Claim 21, line 5, after "and" insert -- a --.
Col. 28, Claim 35, line 3, correct "a multi disc" to --
                           a multi-disc --.
```

Signed and Sealed this

Twenty-first Day of September, 1993

Attest:

BRUCE LEHMAN

Attesting Officer     Commissioner of Patents and Trademarks